United States Patent
Zhou et al.

(10) Patent No.: US 11,765,653 B2
(45) Date of Patent: Sep. 19, 2023

(54) LOAD THRESHOLD DETERMINING METHOD AND APPARATUS

(71) Applicant: HUAWEI TECHNOLOGIES CO., LTD., Guangdong (CN)

(72) Inventors: Qiang Zhou, Chengdu (CN); Peng Lu, Chengdu (CN); Zhenghu Ding, Shanghai (CN); Zhe Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 17/225,646

(22) Filed: Apr. 8, 2021

(65) Prior Publication Data

US 2021/0227461 A1 Jul. 22, 2021

Related U.S. Application Data

(63) Continuation of application No. PCT/CN2019/109983, filed on Oct. 8, 2019.

(30) Foreign Application Priority Data

Oct. 8, 2018 (CN) .......................... 201811167766.3

(51) Int. Cl.
*H04W 52/00* (2009.01)
*H04W 52/02* (2009.01)
*H04W 36/00* (2009.01)

(52) U.S. Cl.
CPC . *H04W 52/0206* (2013.01); *H04W 36/00837* (2018.08)

(58) Field of Classification Search
USPC .............. 370/311; 455/343.5, 522, 571–574
See application file for complete search history.

(56) References Cited

U.S. PATENT DOCUMENTS

2008/0032677 A1* 2/2008 Catovic ............... H04W 72/542
455/414.1
2017/0134970 A1 5/2017 Zhang et al.

FOREIGN PATENT DOCUMENTS

| CN | 1394020 A | 1/2003 |
|---|---|---|
| CN | 101959292 A | 1/2011 |

(Continued)

OTHER PUBLICATIONS

Yu et al., "A Regional Autonomic Energy-saving Management Mechanism for Cellular Networks," Journal of Electronics and Information Technology, Nov. 2012, 34(11):2707-2714.
Abe et al., "Analyzing Business Processes by Automatically Detecting KPI Thresholds," 2016 IEEE International Conference on Services Computing, Sep. 2016, pp. 187-194.

(Continued)

*Primary Examiner* — Suhail Khan
(74) *Attorney, Agent, or Firm* — Fish & Richardson P.C.

(57) ABSTRACT

This application provides an example load threshold determining method and apparatus. The method includes obtaining a plurality of preselected load thresholds of a cell. The method also includes obtaining an evaluation value corresponding to each preselected load threshold in a first periodicity, where each evaluation value is used to evaluate key performance indicator (KPI) information and energy saving information of the cell. The method further includes determining a target load threshold of the cell in a second periodicity based on all evaluation values, where the target load threshold is a load threshold in the plurality of preselected load thresholds, and where the second periodicity is a next periodicity of the first periodicity.

20 Claims, 3 Drawing Sheets

(56) References Cited

FOREIGN PATENT DOCUMENTS

| CN | 102083179 | A  | 6/2011  |
|----|-----------|----|---------|
| CN | 102217233 | A  | 10/2011 |
| CN | 102340853 | A  | 2/2012  |
| CN | 102665259 | A  | 9/2012  |
| CN | 102724677 | A  | 10/2012 |
| CN | 103024880 | A  | 4/2013  |
| CN | 103974350 | A  | 8/2014  |
| CN | 105101298 | A  | 11/2015 |
| CN | 106658572 | A  | 5/2017  |
| CN | 108347745 | A  | 7/2018  |
| EP | 2919531   | A1 | 9/2015  |
| WO | 2012070909| A2 | 5/2012  |
| WO | 2017000986| A1 | 1/2017  |

OTHER PUBLICATIONS

Office Action in Chinese Application No. 201811167766.3, dated Nov. 3, 2020, 27 pages.
PCT International Search Report and Written Opinion in International Application No. PCT/CN2019/109983, dated Jan. 2, 2020, 13 pages.
3GPP 32.835 V2.0.0, (Jun. 2014), "3rd Generation Partnership Project; Technical Specification Group Services and System Aspects; Telecommunication management; Study of Heterogeneous Networks Management (Release 12)," Jun. 2014, 15 pages.
Extended European Search Report issued in European Application No. 19871556.7 dated Nov. 3, 2021, 8 pages.
Semov et al., "Implementation of Machine Learning for Autonomic Capabilities in Self-Organizing Heterogeneous Networks," Wireless Personal Communications, Oct. 2016, 20 pages.

\* cited by examiner

LOAD THRESHOLD DETERMINING METHOD AND APPARATUS

CROSS-REFERENCE TO RELATED APPLICATIONS

This application is a continuation of International Application No. PCT/CN2019/109983, filed on Oct. 8, 2019, which claims priority to Chinese Patent Application No. 201811167766.3, filed on Oct. 8, 2018. The disclosures of the aforementioned applications are hereby incorporated by reference in their entireties.

TECHNICAL FIELD

Embodiments of this application relate to the field of communications technologies, and in particular, to a load threshold determining method and apparatus.

BACKGROUND

Energy consumption expenditures are relatively high expenditures in network operation and maintenance costs of operators. Therefore, reducing energy consumption of base stations is a great concern.

A current method is to set an off time period and a load threshold of a traffic service of a cell. When load of the cell in the off time period is less than or equal to the load threshold, the traffic service of the cell is disabled. It may be understood that a higher load threshold indicates more reduced energy consumption of a base station. However, in order not to affect a key performance indicator (KPI for short) of the cell and end-user experience, the load threshold is usually set relatively conservatively. This limits the reduction of the power consumption of the base station.

Therefore, how to determine a load threshold that can ensure a KPI and can reduce energy consumption of a base station as much as possible is a problem to be urgently resolved.

SUMMARY

This application provides a load threshold determining method and apparatus. A determined load threshold can both ensure a KPI of a cell and reduce energy consumption of a base station as much as possible.

According to a first aspect, an embodiment of this application provides a load threshold determining method, including: obtaining a plurality of preselected load thresholds of a cell; obtaining an evaluation value corresponding to each preselected load threshold in a first periodicity, where each evaluation value is used to evaluate key performance indicator KPI information and energy saving information of the cell; and determining a target load threshold of the cell in a second periodicity based on all evaluation values, where the target load threshold is a load threshold in the plurality of preselected load thresholds, and the second periodicity is a next periodicity of the first periodicity.

The periodicity in this solution is a load threshold update periodicity. In this solution, a load threshold of the cell in a current periodicity is determined based on an evaluation value corresponding to each preselected load threshold of the cell in a previous periodicity. Because the evaluation value can be used to evaluate KPI information and energy saving information of the cell, the load threshold of the cell in the current periodicity is determined after the KPI information and the energy saving information of the cell are comprehensively considered. Therefore, the load threshold determined by using the method in this solution can both ensure a KPI and reduce energy consumption of a base station as much as possible.

In addition, the load threshold of the cell is dynamically determined in this solution, and the load threshold may be changed with reference to a real-time communication status of the cell, thereby further ensuring that the load threshold determined by using the method of this solution can both ensure the KPI and reduce the energy consumption of the base station as much as possible.

First, a process of obtaining the plurality of preselected load thresholds is described.

In a possible design, the obtaining a plurality of preselected load thresholds of a cell includes: obtaining a maximum load threshold and a minimum load threshold of the cell; and obtaining the plurality of preselected load thresholds based on the maximum load threshold and the minimum load threshold, where the plurality of preselected load thresholds include the maximum load threshold and the minimum load threshold.

In this solution, a maximum load threshold and a minimum load threshold are determined, and a load threshold of the cell in each periodicity is selected from a plurality of preselected load thresholds determined based on the maximum load threshold and the minimum load threshold, so that an optional range of the load threshold is determined, thereby reducing a calculation amount of determining the load threshold, and improving efficiency of determining the load threshold in each periodicity.

For obtaining a maximum load threshold, in a possible design, the obtaining a maximum load threshold includes:

obtaining parameter value groups respectively corresponding to a plurality of time periods of the cell, where one parameter value group includes a value of at least one first parameter corresponding to a corresponding time period of the cell, and the at least one first parameter includes load; based on the parameter value groups respectively corresponding to the plurality of time periods, determining a first relationship between at least one first parameter and a throughput rate, and determining M second relationships between the at least one first parameter and M KPIs, where M is a positive integer; and determining the maximum load threshold based on the first relationship and the M second relationships.

The determining the maximum load threshold based on the first relationship and the M second relationships includes: determining first load corresponding to a maximum value of a throughput rate corresponding to a first curve, where the first curve is a curve corresponding to the first relationship;

determining M second load corresponding to maximum values of M KPIs corresponding to M second curves, where the M second curves are curves corresponding to the M second relationships, and the second curves and the second relationships are in a one-to-one correspondence; and determining a smallest value in the first load and the M second load as the maximum load threshold.

Optionally, based on the parameter value groups respectively corresponding to the plurality of time periods, the first relationship between the at least one first parameter and the throughput rate, and the M second relationships between the at least one first parameter and the M KPIs may be determined by using a machine learning algorithm.

In this solution, the maximum load threshold is determined based on the parameter value groups respectively corresponding to the plurality of time periods, so that a communication status of the cell is fully considered, thereby making the determined maximum load threshold relatively accurate.

Second, a process of obtaining an evaluation value corresponding to each preselected load threshold in a first periodicity is described.

In a possible design, before the obtaining an evaluation value corresponding to each preselected load threshold in a first periodicity, the method further includes:

obtaining each target KPI parameter value and each target energy saving parameter value of the cell when a load threshold of the cell is a first load threshold in a third periodicity, where the first load threshold is a target load threshold of the cell in the third periodicity, and the third periodicity is a previous periodicity of the first periodicity; and updating each KPI parameter value that corresponds to the first load threshold and that is recorded in a current record table to each target KPI parameter value, and updating each energy saving parameter value that corresponds to the first load threshold and that is recorded in the current record table to each target energy saving parameter value, to obtain an updated record table, where the record table records each KPI parameter value, each energy saving parameter value, and an evaluation value that correspond to each preselected load threshold.

In this solution, setting of the record table implements an objective of obtaining an evaluation value corresponding to each preselected load threshold.

Based on the updated record table, the evaluation value corresponding to each preselected load threshold in the first periodicity is obtained. In a possible design, the obtaining an evaluation value corresponding to each preselected load threshold in a first periodicity includes:

for a preselected load threshold, determining, based on a first KPI parameter value set, a second KPI parameter value set, a first energy saving parameter value set, and a second energy saving parameter value set, an evaluation value corresponding to the preselected load threshold in the first periodicity, where the first KPI parameter value set is a set of KPI parameter values that correspond to the preselected load threshold and that are recorded in the updated record table, the second KPI parameter value set is a set of KPI parameter values that correspond to the minimum load threshold and that are in the updated record table, the first energy saving parameter value set is a set of energy saving parameter values that correspond to the preselected load threshold and that are in the updated record table, and the second energy saving parameter value set is a set of energy saving parameter values that correspond to the minimum load threshold and that are in the updated record table.

The determining, based on a first KPI parameter value set, a second KPI parameter value set, a first energy saving parameter value set, and a second energy saving parameter value set, an evaluation value corresponding to the preselected load threshold in the first periodicity includes:

determining, based on the first KPI parameter value set and the second KPI parameter value set, a KPI evaluation value of the cell and a KPI evaluation value of a cluster in which the cell is located; determining an energy saving evaluation value of the cell based on the first energy saving parameter value set and the second energy saving parameter value set; and obtaining, based on the KPI evaluation value of the cell, the KPI evaluation value of the cluster in which the cell is located, and the energy saving evaluation value of the cell, the evaluation value corresponding to the preselected load threshold in the first periodicity.

There are two types of KPIs for the cell. One type is preferentially as small as possible and is referred to as a first-type KPI. For example, a call drop rate is a first-type KPI. The other type is preferentially as large as possible and is referred to as a second-type KPI. For example, a call completion rate is a second-type KPI. Therefore, during determining of the KPI evaluation value of the cell and the KPI evaluation value of the cluster in which the cell is located, the first-type KPI and the second-type KPI need to be separately considered.

In this case, a method for obtaining the KPI evaluation value of the cell includes:

for a first-type KPI:

obtaining a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a difference between the first ratio and the second ratio is greater than a first absolute deterioration threshold of the cell, determining that a fifth target KPI evaluation value that is of the cell and that corresponds to the first-type KPI is a second preset value; or if a difference between the first ratio and the second ratio is less than or equal to the first absolute deterioration threshold, determining that the fifth target KPI evaluation value is a first preset value, where the first absolute deterioration threshold is a third standard deviation multiplied by a first coefficient, and the third standard deviation is a standard deviation of a plurality of first-type KPIs of the cell within first preset duration before the first periodicity;

for a second-type KPI:

obtaining a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set; and if a difference between the third ratio and the fourth ratio is less than a second absolute deterioration threshold of the cell, determining that a sixth target KPI evaluation value that is of the cell and that corresponds to the second-type KPI is a second preset value; or if a difference between the third ratio and the fourth ratio is greater than or equal to the second absolute deterioration threshold, determining that the sixth target KPI evaluation value is a first preset value, where the second absolute deterioration threshold is an opposite number of a product of a fourth standard deviation and a first coefficient, and the fourth standard deviation is a standard deviation of a plurality of second-type KPIs of the cell within first preset duration before the first periodicity; and obtaining the KPI evaluation value of the cell based on each fifth target KPI evaluation value and/or each sixth target KPI evaluation value.

The second preset value is less than the first preset value. For example, the first preset value may be 1, and the second preset value may be 0.

In this solution, obtaining of the KPI evaluation value of the cell is determined based on whether the KPI of the preselected load threshold is better than the KPI of the minimum load threshold, and the obtained KPI evaluation value of the cell is objective and accurate, so that a finally obtained evaluation value corresponding to the preselected load threshold is objective and accurate.

Then, a method for obtaining a KPI evaluation value of a cluster in which the cell is located includes.

in a possible design, the determining, based on the first KPI parameter value set and the second KPI parameter value set, a KPI evaluation value of a cluster in which the cell is located includes:

for a first-type KPI, determining, based on parameters corresponding to the first-type KPI in the first KPI parameter value set and the second KPI parameter value set, a first target KPI evaluation value that is of the cluster and that corresponds to the first-type KPI; for a second-type KPI, determining, based on parameters corresponding to the second-type KPI in the first KPI parameter value set and the second KPI parameter value set, a second target KPI evaluation value that is of the cluster and that corresponds to the second-type KPI; and obtaining, based on each first target KPI evaluation value and/or each second target KPI evaluation value, the KPI evaluation value of the cluster in which the cell is located.

If the preselected load threshold is not a target load threshold of the first periodicity, the obtaining of the first target KPI evaluation value that is of the cluster and that corresponds to the first-type KPI includes:

obtaining a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a first difference between the first ratio and the second ratio is less than or equal to 0, determining that the first target KPI evaluation value is a first preset value; or if the first difference is greater than 0, determining that the first target KPI evaluation value is a third target KPI evaluation value, where the third target KPI evaluation value is a KPI evaluation value that is of the cluster, that corresponds to the first-type KPI, and that corresponds to the preselected load threshold in the third periodicity.

If the preselected load threshold is a target load threshold of the first periodicity, the obtaining of the first target KPI evaluation value that is of the cluster and that corresponds to the first-type KPI includes:

obtaining a first value based on parameters that correspond to the first-type KPI and that are in first KPI parameter value sets corresponding to all cells included in the cluster in which the cell is located; obtaining a second value based on parameters that correspond to the first-type KPI and that are in second KPI parameter value sets corresponding to all the cells included in the cluster in which the cell is located; and if a value obtained by dividing a difference between the first value and the second value by the first value is less than or equal to a third value, determining that the first target KPI evaluation value is the third target KPI evaluation value, where the third value is a preset multiple of a ratio of a first standard deviation to a first average value, the first standard deviation is a standard deviation of first values corresponding to a preset quantity of periodicities before the first periodicity, and the first average value is an average value of the first values corresponding to the preset quantity of periodicities before the first periodicity; or if a value obtained by dividing a difference between the first value and the second value by the first value is greater than the third value and the cell is in a first cell set, determining that the first target KPI evaluation value is a second preset value; or if a value obtained by dividing a difference between the first value and the second value by the first value is greater than the third value and the cell is not in a first cell set, determining that the first target KPI evaluation value is the third target KPI evaluation value, where the first cell set is a set of W cells with first differences ranking top W after first differences are sorted in descending order in cells included in the cluster with the first differences greater than 0.

If the preselected load threshold is not a target load threshold of the first periodicity, the obtaining of the second target KPI evaluation value of the cluster corresponding to the second-type KPI includes:

obtaining a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set; and if a second difference between the third ratio and the fourth ratio is greater than or equal to 0, determining that the second target KPI evaluation value is a first preset value; or if the second difference is less than 0, determining that the second target KPI evaluation value is a fourth target KPI evaluation value, where the fourth target KPI evaluation value is a KPI evaluation value that is of the cluster, that corresponds to the second-type KPI, and that corresponds to the preselected load threshold in the third periodicity.

If the preselected load threshold is a target load threshold of the first periodicity, the obtaining of the second target KPI evaluation value that is of the cluster and that corresponds to the second-type KPI includes:

obtaining a fourth value based on parameters that correspond to the second-type KPI and that are in first KPI parameter value sets corresponding to all cells included in the cluster in which the cell is located; obtaining a fifth value based on parameters that correspond to the second-type KPI and that are in second KPI parameter value sets corresponding to all the cells included in the cluster in which the cell is located; and if a value obtained by dividing a second difference between the fourth value and the fifth value by the fourth value is greater than or equal to a sixth value, determining that the second target KPI evaluation value in the first periodicity is the fourth target KPI evaluation value, where the sixth value is an opposite number of a preset multiple of a ratio of a second standard deviation to a second average value, the second standard deviation is a standard deviation of fourth values corresponding to a preset quantity of periodicities before the first periodicity, and the second average value is an average value of the fourth values corresponding to the preset quantity of periodicities before the first periodicity; if a value obtained by dividing a difference between the fourth value and the fifth value by the fourth value is less than a sixth value and the cell is in a second cell set, determining that the second target KPI evaluation value is a second preset value; or if a value obtained by dividing a difference between the fourth value and the fifth value by the fourth value is less than a sixth value and the cell is not in a second cell set, determining that the second target KPI evaluation value is the fourth target KPI evaluation value, where the second cell set is a set of W cells with second differences ranking top W after absolute values of second differences are sorted in descending order in cells included in the cluster with the second differences less than or equal to 0.

In this solution, obtaining of the KPI evaluation value of the cluster in which the cell is located is determined based on whether a KPI that is of the cluster and that corresponds to the preselected load threshold is better than a KPI that is of the cluster and that corresponds to the minimum load threshold, and the obtained KPI evaluation value of the cluster in which the cell is located is objective and accurate, so that a finally obtained evaluation value corresponding to the preselected load threshold is objective and accurate.

Then, a method for determining the target load threshold of the cell in the second periodicity based on all evaluation values is described.

In a possible design, the determining a target load threshold of the cell in the second periodicity based on all evaluation values includes:

determining a first probability that a first preselected load threshold is determined as the target load threshold of the cell in the second periodicity, where the first preselected load threshold is a preselected load threshold corresponding to a largest evaluation value among all the evaluation values;

determining a second probability that a second preselected load threshold is determined as the target load threshold of the cell in the second periodicity, where the second preselected load threshold is any load threshold other than the first preselected load threshold in the plurality of preselected load thresholds; and determining the target load threshold of the cell based on the first probability and the second probability.

The determining a first probability that a first preselected load threshold is determined as the target load threshold of the cell in the second periodicity includes:

determining a third probability based on a periodicity sequence number of the second periodicity and a quantity of preselected load thresholds; and determining a difference between 1 and the third probability as the first probability.

The determining a second probability that a second preselected load threshold is determined as the target load threshold of the cell in the second periodicity includes:

determining the second probability based on the third probability and the quantity of preselected load thresholds.

In this solution, based on the foregoing method for obtaining an evaluation value corresponding to each preselected load threshold in the first periodicity, a largest evaluation value indicates that when a preselected load threshold corresponding to the largest evaluation value is selected as the target load threshold in the second periodicity, comprehensive performance of a KPI and energy saving of the cell is the best. Therefore, a probability that the preselected load threshold corresponding to the largest evaluation value is selected as the target load threshold in the second periodicity is the largest, so that a probability that the determined target load threshold in the second periodicity can both ensure the KPI and reduce energy consumption of a base station as much as possible is the largest.

In a possible design, before the obtaining each target KPI parameter value of the cell when a load threshold of the cell is a first load threshold in a third periodicity, the method further includes:

obtaining each original KPI and each original energy saving value when the load threshold of the cell is a first load threshold in a third periodicity;

for a first-type KPI in the original KPIs, determining whether an absolute value of a difference between a first original KPI and a third average value corresponding to the first-type KPI is greater than a seventh value, and if an obtained determining result is yes, determining that the first original KPI is a normal value, where the third average value is a historical average value of the first original KPI, the seventh value is equal to a second coefficient multiplied by a fifth standard deviation, the fifth standard deviation is a standard deviation of a plurality of first-type KPIs of the cell within second preset duration before the third periodicity, and optionally, the second coefficient may be 4; and for a second-type KPI in the original KPIs, determining whether an absolute value of a difference between a second original KPI and a fourth average value corresponding to the second-type KPI is less than an eighth value, and if an obtained determining result is yes, determining that the second original KPI is a normal value, where the fourth average value is a historical average value of the second original KPI, the eighth value is equal to an opposite number of a product of the second coefficient and a sixth standard deviation, and the sixth standard deviation is a standard deviation of a plurality of second-type KPIs of the cell within the second preset duration before the third periodicity.

In this solution, abnormal original values are removed, so that the KPI parameter values recorded in the record table are normal values, thereby ensuring accuracy of a calculated evaluation value corresponding to each preselected load threshold.

According to a second aspect, an embodiment of this application provides a load threshold determining apparatus, including:

an obtaining module, configured to obtain a plurality of preselected load thresholds of a cell, where the obtaining module is further configured to obtain an evaluation value corresponding to each preselected load threshold in a first periodicity, where each evaluation value is used to evaluate key performance indicator KPI information and energy saving information of the cell; and a determining module, configured to determine a target load threshold of the cell in a second periodicity based on all evaluation values, where the target load threshold is a load threshold in the plurality of preselected load thresholds, and the second periodicity is a next periodicity of the first periodicity.

In a possible design, the obtaining module is specifically configured to:

obtain a maximum load threshold and a minimum load threshold of the cell, and obtain the plurality of preselected load thresholds based on the maximum load threshold and the minimum load threshold, where the plurality of preselected load thresholds include the maximum load threshold and the minimum load threshold.

In a possible design, the obtaining module is specifically configured to:

obtain parameter value groups respectively corresponding to a plurality of time periods of the cell, where one parameter value group includes a value of at least one first parameter corresponding to a corresponding time period of the cell, and the at least one first parameter includes load;

based on the parameter value groups respectively corresponding to the plurality of time periods, determine a first relationship between at least one first parameter and a throughput rate and determine M second relationships between the at least one first parameter and M KPIs, where M is a positive integer; and determine the maximum load threshold based on the first relationship and the M second relationships.

In a possible design, the obtaining module is specifically configured to:

determine first load corresponding to a maximum value of a throughput rate corresponding to a first curve, where the first curve is a curve corresponding to the first relationship;

determine M second load corresponding to maximum values of M KPIs corresponding to M second curves, where the M second curves are curves corresponding to the M second relationships, and the second curves and the second relationships are in a one-to-one correspondence; and determine a smallest value in the first load and the M second load as the maximum load threshold.

In a possible design, the apparatus stores a record table used to record each KPI parameter value, each energy saving parameter value, and an evaluation value that correspond to each preselected load threshold.

The obtaining module is further configured to: before obtaining the evaluation value corresponding to each preselected load threshold in the first periodicity, obtain each target KPI parameter value and each target energy saving parameter value of the cell when a load threshold of the cell is a first load threshold in a third periodicity, where the first load threshold is a target load threshold of the cell in the third periodicity, and the third periodicity is a previous periodicity of the first periodicity; and update each KPI parameter value that corresponds to the first load threshold and that is recorded in a current record table to each target KPI parameter value, and update each energy saving parameter value that corresponds to the first load threshold and that is recorded in the current record table to each target energy saving parameter value, to obtain an updated record table.

In a possible design, the obtaining module is specifically configured to:

for a preselected load threshold, determine, based on a first KPI parameter value set, a second KPI parameter value set, a first energy saving parameter value set, and a second energy saving parameter value set, an evaluation value corresponding to the preselected load threshold in the first periodicity, where the first KPI parameter value set is a set of KPI parameter values that correspond to the preselected load threshold and that are recorded in the updated record table, the second KPI parameter value set is a set of KPI parameter values that correspond to the minimum load threshold and that are in the updated record table, the first energy saving parameter value set is a set of energy saving parameter values that correspond to the preselected load threshold and that are in the updated record table, and the second energy saving parameter value set is a set of energy saving parameter values that correspond to the minimum load threshold and that are in the updated record table.

In a possible design, the obtaining module is specifically configured to:

determine, based on the first KPI parameter value set and the second KPI parameter value set, a KPI evaluation value of the cell and a KPI evaluation value of a cluster in which the cell is located;

determine an energy saving evaluation value of the cell based on the first energy saving parameter value set and the second energy saving parameter value set, and obtain, based on the KPI evaluation value of the cell, the KPI evaluation value of the cluster in which the cell is located, and the energy saving evaluation value of the cell, an evaluation value corresponding to the preselected load threshold in the first periodicity.

In a possible design, the determining module is specifically configured to:

determine a first probability that a first preselected load threshold is determined as the target load threshold of the cell in the second periodicity, where the first preselected load threshold is a preselected load threshold corresponding to a largest evaluation value among all the evaluation values;

determine a second probability that a second preselected load threshold is determined as the target load threshold of the cell in the second periodicity, where the second preselected load threshold is any load threshold other than the first preselected load threshold in the plurality of preselected load thresholds; and determine the target load threshold of the cell based on the first probability and the second probability.

In a possible design, the determining module is specifically configured to:

determine a third probability based on a periodicity sequence number of the second periodicity and a quantity of preselected load thresholds and determine a difference between 1 and the third probability as the first probability.

In a possible design, the determining module is specifically configured to:

determine the second probability based on the third probability and the quantity of preselected load thresholds.

In a possible design, the obtaining module is specifically configured to:

for a first-type KPI, determine, based on parameters corresponding to the first-type KPI in the first KPI parameter value set and the second KPI parameter value set, a first target KPI evaluation value that is of the cluster and that corresponds to the first-type KPI;

for a second-type KPI, determine, based on parameters corresponding to the second-type KPI in the first KPI parameter value set and the second KPI parameter value set, a second target KPI evaluation value that is of the cluster and that corresponds to the second-type KPI; and obtain, based on each first target KPI evaluation value and/or each second target KPI evaluation value, the KPI evaluation value of the cluster in which the cell is located.

In a possible design, the obtaining module is specifically configured to:

obtain a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a first difference between the first ratio and the second ratio is less than or equal to 0, determine that the first target KPI evaluation value is a first preset value; or if the first difference is greater than 0, determine that the first target KPI evaluation value is a third target KPI evaluation value, where the third target KPI evaluation value is a KPI evaluation value that is of the cluster, that corresponds to the first-type KPI, and that corresponds to the preselected load threshold in the third periodicity; or obtain a first value based on parameters that correspond to the first-type KPI and that are in first KPI parameter value sets corresponding to all cells included in the cluster in which the cell is located;

obtain a second value based on parameters that correspond to the first-type KPI and that are in second KPI parameter value sets corresponding to all the cells included in the cluster in which the cell is located, and if a value obtained by dividing a difference between the first value and the second value by the first value is less than or equal to a third value, determine that the first target KPI evaluation value is the third target KPI evaluation value, where the third value is a preset multiple of a ratio of a first standard deviation to a first average value, the first standard deviation is a standard deviation of first values corresponding to a preset quantity of periodicities before the first periodicity, and the first average value is an average value of the first values corresponding to the preset quantity of periodicities before the first periodicity; or if a value obtained by dividing a difference between the first value and the second value by the first value is greater than the third value and the cell is in a first cell set, determine that the first target KPI evaluation value is a second preset value; or if a value obtained by dividing a difference between the first value and the second value by the first value is greater than the third value and the cell is not in a first cell set, determine that the first target KPI evaluation value is the third target KPI evaluation value, where the first cell set is a set of W cells with first differences ranking top W after first differences are sorted in descending order in cells included in the cluster with the first differences greater than 0.

In a possible design, the obtaining module is specifically configured to:

obtain a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set, and if a second difference between the third ratio and the fourth ratio is greater than or equal to 0, determine that the second target KPI evaluation value is a first preset value; or if the second difference is less than 0, determine that the second target KPI evaluation value is a fourth target KPI evaluation value, where the fourth target KPI evaluation value is a KPI evaluation value that is of the cluster, that corresponds to the second-type KPI, and that corresponds to the preselected load threshold in the third periodicity; or obtain a fourth value based on parameters that correspond to the second-type KPI and that are in first KPI parameter value sets corresponding to all cells included in the cluster in which the cell is located:

obtain a fifth value based on parameters that correspond to the second-type KPI and that are in second KPI parameter value sets corresponding to all the cells included in the cluster in which the cell is located; and if a value obtained by dividing a second difference between the fourth value and the fifth value by the fourth value is greater than or equal to a sixth value, determine that the second target KPI evaluation value in the first periodicity is the fourth target KPI evaluation value, where the sixth value is an opposite number of a preset multiple of a ratio of a second standard deviation to a second average value, the second standard deviation is a standard deviation of fourth values corresponding to a preset quantity of periodicities before the first periodicity, and the second average value is an average value of the fourth values corresponding to the preset quantity of periodicities before the first periodicity; or if a value obtained by dividing a difference between the fourth value and the fifth value by the fourth value is less than a sixth value and the cell is in a second cell set, determine that the second target KPI evaluation value is a second preset value; or if a value obtained by dividing a difference between the fourth value and the fifth value by the fourth value is less than a sixth value and the cell is not in a second cell set, determine that the second target KPI evaluation value is the fourth target KPI evaluation value, where the second cell set is a set of W cells with second differences ranking top W after absolute values of second differences are sorted in descending order in cells included in the cluster with the second differences less than or equal to 0.

In a possible design, the obtaining module is specifically configured to:

for a first-type KPI:

obtain a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a difference between the first ratio and the second ratio is greater than a first absolute deterioration threshold of the cell, determine that a fifth target KPI evaluation value that is of the cell and that corresponds to the first-type KPI is a second preset value; or if a difference between the first ratio and the second ratio is less than or equal to the first absolute deterioration threshold, determine that the fifth target KPI evaluation value is a first preset value, where the first absolute deterioration threshold is a third standard deviation multiplied by a first coefficient, and the third standard deviation is a standard deviation of a plurality of first-type KPIs of the cell within first preset duration before the first periodicity;

for a second-type KPI:

obtain a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set; and if a difference between the third ratio and the fourth ratio is less than a second absolute deterioration threshold of the cell, determine that a sixth target KPI evaluation value that is of the cell and that corresponds to the second-type KPI is a second preset value; or if a difference between the third ratio and the fourth ratio is greater than or equal to the second absolute deterioration threshold, determine that the sixth target KPI evaluation value is a first preset value, where the second absolute deterioration threshold is an opposite number of a product of a fourth standard deviation and a first coefficient, and the fourth standard deviation is a standard deviation of a plurality of second-type KPIs of the cell within first preset duration before the first periodicity; and obtain the KPI evaluation value of the cell based on each fifth target KPI evaluation value and/or each sixth target KPI evaluation value.

In a possible design, the obtaining module is further configured to: before obtaining the target KPI parameter values of the cell when the load threshold of the cell is the first load threshold in the third periodicity:

obtain each original KPI and each original energy saving value when the load threshold of the cell is a first load threshold in the third periodicity;

for a first-type KPI in the original KPIs, determine whether an absolute value of a difference between a first original KPI and a third average value corresponding to the first-type KPI is greater than a seventh value, and if an obtained determining result is yes, determine that the first original KPI is a normal value, where the third average value is a historical average value of the first original KPI, the seventh value is equal to a second coefficient multiplied by a fifth standard deviation, the fifth standard deviation is a standard deviation of a plurality of first-type KPIs of the cell within second preset duration before the third periodicity, and optionally, the second coefficient may be 4; and for a second-type KPI in the original KPIs, determine whether an absolute value of a difference between a second original KPI and a fourth average value corresponding to the second-type KPI is less than an eighth value, and if an obtained determining result is yes, determine that the second original KPI is a normal value, where the fourth average value is a historical average value of the second original KPI, the eighth value is equal to an opposite number of a product of the second coefficient and a sixth standard deviation, and the sixth standard deviation is a standard deviation of a plurality of second-type KPIs of the cell within the second preset duration before the third periodicity.

According to a third aspect, an embodiment of this application provides a load threshold determining apparatus, including a processor.

The processor is configured to be coupled to a memory, and read and execute an instruction in the memory, to implement the method according to any one of the first aspect and the possible designs of the first aspect.

According to a fourth aspect, an embodiment of this application provides a computer storage medium, including an instruction. When the instruction is run on a load threshold determining apparatus, the load threshold determining apparatus is enabled to perform the method according to any one of the first aspect and the possible designs of the first aspect.

In this application, a load threshold of the cell in a current periodicity is determined based on an evaluation value corresponding to each preselected load threshold of the cell in a previous load update periodicity. Because the evaluation value can be used to evaluate KPI information and energy saving information of the cell, the load threshold of the cell in the current periodicity is determined after the KPI information and the energy saving information of the cell are comprehensively considered. Therefore, the load threshold determined by using the method in this embodiment can both ensure a KPI and reduce energy consumption of a base station as much as possible.

DESCRIPTION OF EMBODIMENTS

In this application, "at least one" means one or more, and "a plurality of" means two or more. "And/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may indicate: a, b, c, a and b, a and c, b and c, or a, b, and c, where a, b, and c may be a single item, or may be a plurality of items. In this application, the terms "first", "second", and so on are intended to distinguish between similar objects but do not necessarily indicate a specific order or sequence.

Figure 1:
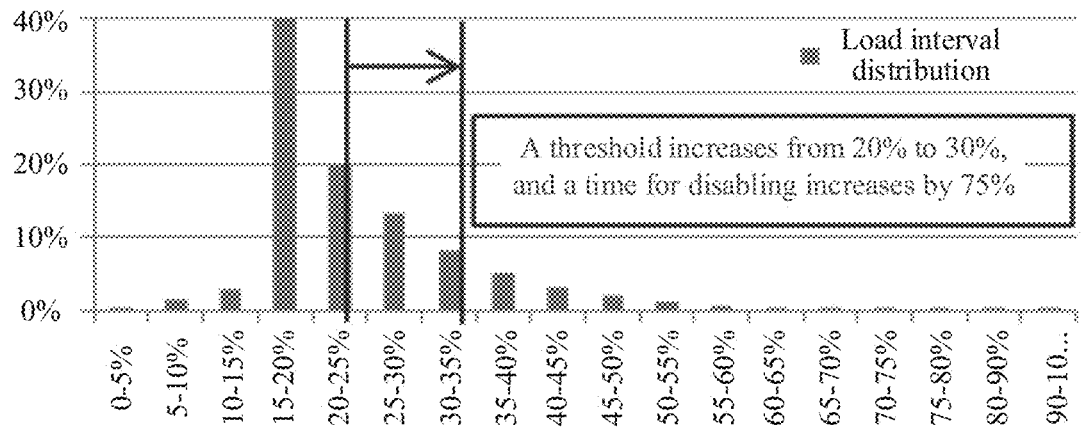
FIG. 1 is a histogram of proportions of cells under different load thresholds in a day according to an embodiment of this application.

FIG. 1 is a histogram of proportions of cells under different load thresholds in a day according to an embodiment of this application.

Currently, in a preset time period, if a load value of a cell is less than a specified load threshold, a traffic service of the cell may be disabled. A relatively common load threshold currently is 20%. Referring to FIG. 1, it can be learned that a proportion of cells with a load threshold ranging from 20% to 25% is 10%, and a proportion of cells with a load threshold ranging from 25% to 30% is approximately 8%. If the load threshold can be increased from 20% to 25%, a quantity of cells whose traffic services can be disabled increases by a particular proportion, and duration within which a traffic service of each cell whose traffic service can be disabled is disabled is increased. If the load threshold can be increased from 20% to 30%, the quantity of cells whose traffic services can be disabled further increases, and the duration within which the traffic service of each cell whose traffic service can be disabled is disabled is further increased. Increasing the load threshold is allowed in reduction of power consumption of a base station, but a KPI of the cell may be affected. Therefore, a method in the embodiments of this application is proposed to determine a load threshold that can both ensure the KPI and reduce the energy consumption as much as possible.

Because a communication status of a cell is not constant, to reduce impact of setting a load threshold on a KPI as much as possible, a load threshold determining method in this application is a method for dynamically determining a load threshold. To be specific, a load threshold update periodicity and a plurality of preselected load thresholds are preset, and a load threshold of the cell in a next periodicity is determined based on an evaluation value corresponding to each preselected load threshold in a current periodicity. The evaluation value is used to evaluate KPI information and energy saving information of the cell.

Figure 2:
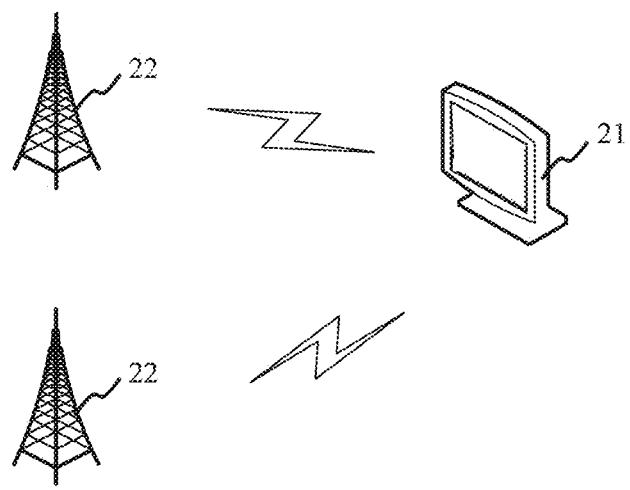
FIG. 2 is a schematic diagram of an application scenario according to an embodiment of this application.

FIG. 2 is a schematic diagram of an application scenario according to an embodiment of this application. Referring to FIG. 2, a load threshold determining apparatus 21 is configured to; determine a target load threshold in a next load threshold update periodicity based on an evaluation value corresponding to each preselected load threshold in a current load threshold update periodicity, and send the determined load threshold to a base station 22. The base station 22 controls, in the next load threshold update periodicity, an off moment of a traffic service of a cell in the current load threshold update periodicity based on the target load threshold.

In another manner, the load threshold determining apparatus 21 may further be a part of the base station 22.

The following describes a load threshold determining method in this application with reference to a specific embodiment.

Figure 3:
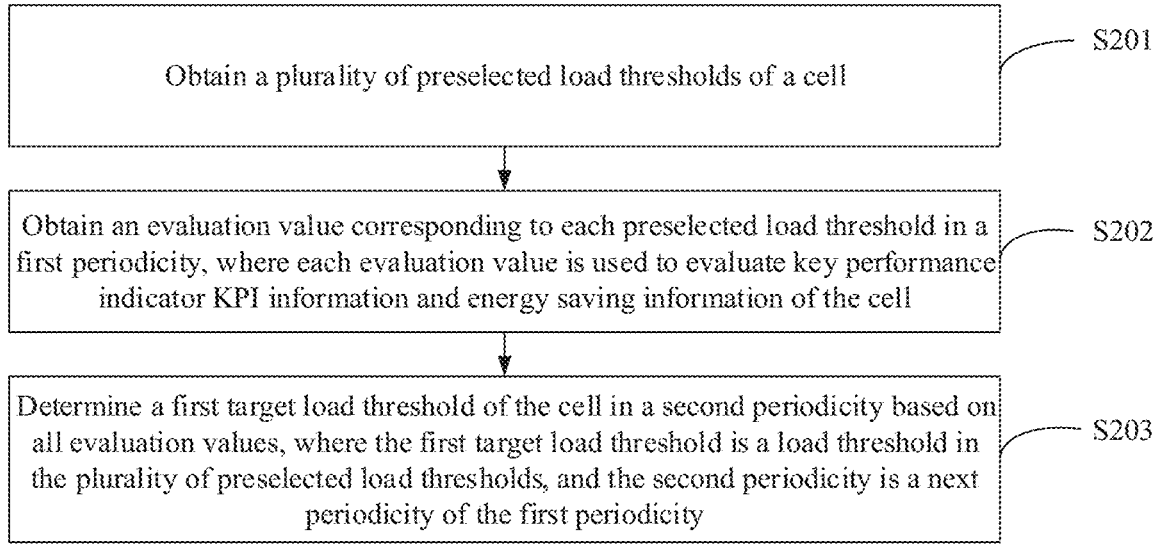
FIG. 3 is a flowchart of a load threshold determining method according to an embodiment of this application.

FIG. 3 is a flowchart of a load threshold determining method according to an embodiment of this application. Referring to FIG. 3, the method in this embodiment includes the following steps.

Step S201: Obtain a plurality of preselected load thresholds of a cell.

Step S202: Obtain an evaluation value corresponding to each preselected load threshold in a first periodicity, where each evaluation value is used to evaluate key performance indicator KPI information and energy saving information of the cell.

Step S203: Determine a target load threshold of the cell in a second periodicity based on all evaluation values, where the target load threshold is a load threshold in the plurality of preselected load thresholds, and the second periodicity is a next periodicity of the first periodicity.

Specifically, this embodiment may be performed by the load threshold determining apparatus 21 shown in FIG. 2. Step S201 to step S203 in this embodiment are performed for each cell of a base station. The following describes the method in this embodiment by using one cell as an example.

In step S201, to ensure a KPI, a load threshold of the cell should not be excessively high, and to reduce power consumption of the base station, the load threshold of the cell should not be excessively low. Therefore, the plurality of preselected load thresholds need to be determined within a range of the load threshold. A target load threshold selected in each load threshold update periodicity is one of the plurality of preselected load thresholds.

In a manner, the obtaining a plurality of preselected load thresholds of a cell includes the following steps.

(1) Obtain a maximum load threshold and a minimum load threshold of the cell.

The minimum load threshold may be a preset value, for example, a currently common load threshold 20%.

A method for obtaining the maximum load threshold may include the following steps.

$a_1$. Obtain parameter value groups respectively corresponding to a plurality of time periods of the cell, where one parameter value group includes a value of at least one first parameter corresponding to a corresponding time period of the cell, and the at least one first parameter includes load.

The plurality of time periods herein may be a plurality of time periods within preset duration before a current moment. For example, the plurality of time periods herein are parameter value groups respectively corresponding to 24×7 time periods within a week before the current moment, and one hour is one time period. At least one parameter included in the parameter value group herein includes at least load, and may further include a user quantity and a carrier bandwidth.

It may be understood that the parameter value groups respectively corresponding to the plurality of time periods of the cell are obtained by the load threshold determining apparatus from the base station.

$a_2$. Based on the parameter value groups respectively corresponding to the plurality of time periods, determine a first relationship between the at least one first parameter and a throughput rate, and determine M second relationships between the at least one first parameter and M KPIs where M is a positive integer.

The M KPIs may include at least one of a call drop rate, a call completion rate, and a handover success rate.

To make the obtained first relationship and the obtained second relationships relatively accurate, in a manner, based on the parameter value groups respectively corresponding to the plurality of time periods and a pre-trained machine learning model, the first relationship between the at least one first parameter and the throughput is determined, and the M second relationships between the at least one first parameter and the M KPIs are determined.

The machine learning model may be a regression model, for example, a linear regression model. The following uses a linear regression model as an example to describe a process of obtaining the linear regression model and a process of obtaining the first relationship and the M second relationships by using the linear regression model.

In the process of obtaining the linear regression model, a plurality of training samples and each training sample label are obtained. Each training sample includes a training parameter value group corresponding to a time period (a length of the time period is the same as a length of the time period in $a_1$). A type of a parameter included in a training parameter value group is the same as a type included in the parameter value group in $a_1$. For example, a training sample a is a load value and a user quantity that correspond to a time period from X3 (hour) to X4 (hour), X1 (month) X2 (day), and a training sample b is a load value and a user quantity that correspond to a time period from X4 (hour) to X5 (hour), X1 (month) X2 (day). A quantity of labels of each training sample is M+1. The M+1 labels include a first label indicating a throughput rate in a time period corresponding to the training sample, and M second labels indicating M KPIs in the time period corresponding to the training sample.

A plurality of training samples are trained based on a first label of each training sample by using a linear regression algorithm (for example, a support vector regression (SVR for short) algorithm or a polynomial regression (PR for short) algorithm), to obtain a first linear regression model. For a KPI, a plurality of training samples are trained based on a second label corresponding to the KPI of each training sample by using a linear regression algorithm, to obtain a second linear regression model, and M second linear regression models are obtained in total for M KPIs.

A machine learning model generation apparatus and the load threshold determining apparatus may be in a same device, or may be located in different devices.

The parameter value groups respectively corresponding to the plurality of time periods obtained in $a_1$ are used as inputs of the first linear regression model successively to obtain a plurality of pieces of throughput indication information, and the first relationship is obtained based on the parameter value groups respectively corresponding to the plurality of time periods and the plurality of pieces of throughput indication information.

For a KPI, the parameter value groups respectively corresponding to the plurality of time periods obtained in $a_1$ are used as inputs of a second linear regression model corresponding to the KPI, to obtain a plurality of pieces of information indicating the KPI, and a second relationship between the at least one parameter and the KPI is obtained based on the parameter value groups respectively corresponding to the plurality of time periods and the plurality of pieces of information indicating the KPI. M second relationships are obtained in total for M KPIs.

a3. Determine the maximum load threshold based on the first relationship and the M second relationships.

The foregoing step is specifically; determining first load corresponding to a maximum value of a throughput rate corresponding to a first curve, where the first curve is a curve corresponding to the first relationship; determining M second load corresponding to M maximum values of M KPIs corresponding to M second curves, where the M second curves are curves corresponding to the M second relationships, and the two curves and the second relationships are in a one-to-one correspondence; and determining a smallest value in the first load and the M second load as the maximum load threshold.

If a vertical coordinate of the first curve corresponding to the first relationship is the throughput rate and a horizontal coordinate is the at least one parameter, a value of load indicated by a horizontal coordinate corresponding to a maximum value of the throughput rate on the first curve is first load. For a KPI, if a vertical coordinate of a second curve corresponding to a second relationship corresponding to the KPI is the KPI, and a horizontal coordinate is the at least one parameter, a value of load indicated by a horizontal coordinate corresponding to a maximum value of the KPI on the second curve is second load corresponding to the KPI. In this way, M+1 load values are obtained in total: first load and M second load, and a smallest value in the M+1 load values is the maximum load threshold.

In the foregoing method for obtaining the maximum load threshold, the maximum load threshold is determined based on the parameter value group respectively corresponding to the plurality of time periods, so that a communication status of a cell is fully considered, thereby making the determined maximum load threshold relatively accurate.

(2) Obtain the plurality of preselected load thresholds based on the maximum load threshold and the minimum load threshold, where the plurality of preselected load thresholds include the maximum load threshold and the minimum load threshold.

That is, the plurality of preselected load thresholds include the maximum load threshold, the minimum load threshold, and a load threshold between the maximum load threshold and the minimum load threshold.

For example, if the maximum load threshold and the minimum load threshold that are obtained in (1) are respectively 30% and 20%, the plurality of preselected load thresholds may be 20%, 21%, 22%, 23%, 24%, 25%, 26%, 27%, 28%, 29%, and 30%.

In step S202 and step S203, the evaluation value corresponding to each preselected load threshold in the first periodicity is obtained, where each evaluation value is used to evaluate KPI information and energy saving information of the cell; and the target load threshold of the cell in the second periodicity is determined based on all evaluation values corresponding to the first periodicity, where the target load threshold is a load threshold in the plurality of preselected load thresholds, and the second periodicity is a next periodicity of the first periodicity. Each periodicity in this embodiment is a load threshold update periodicity.

Specifically, in an initialization phase, the load threshold of the cell is successively set to the foregoing plurality of preselected load thresholds. For example, the load threshold of the cell is first set to 20%, and the base station monitors KPI information and energy saving information of the cell under the load threshold; then, the load threshold of the cell is set to 21%, and the base station monitors KPI information and energy saving information of the cell under the load threshold; and so on, to obtain KPI information and energy saving information when the load threshold of the cell is each of the preselected load thresholds in the initialization phase. The base station sends, to the load threshold determining apparatus, the KPI information and the energy saving information that are monitored when the load threshold of the cell is each of the preselected load thresholds in the initialization phase.

A record table is set, and the record table is used to record each KPI parameter value, each energy saving parameter value, and an evaluation value that correspond to each preselected load threshold corresponding to the cell. The record table may be shown in Table 1.

TABLE 1

A possible record table

Cell ID

| | | | | |
|---|---|---|---|---|
| Preselected load threshold identifier | 0 | 1 | ... | G-1 |
| Numerator filtering value of $KPI_0$ | xx | xx | xx | xx |
| Denominator filtering value of $KPI_0$ | xx | xx | xx | xx |
| Numerator filtering value of $KPI_1$ | xx | xx | xx | xx |
| Denominator filtering value of $KPI_1$ | xx | xx | xx | xx |
| Energy saving gain value | xx | xx | xx | xx |
| Evaluation Value | xx | xx | xx | xx |

In Table 1, the cell ID is an identifier of the cell, 0 may indicate the minimum load threshold, and G−1 may indicate the maximum load threshold. The numerator filtering value of $KPI_0$, the denominator filtering value of $KPI_0$, the numerator filtering value of $KPI_1$, and the denominator filtering value of KPI in Table 1 are all KPI parameter values. The numerator filtering value of $KPI_0$ is a value obtained after numerator filtering of $KPI_0$, the denominator filtering value of $KPI_0$ is a value obtained after denominator filtering of $KPI_0$, the numerator filtering value of $KPI_1$ is a value obtained after denominator filtering of $KPI_1$, and the denominator filtering value of $KPI_1$ is a value obtained after denominator filtering of $KPI_1$. The numerator filtering value of $KPI_0$ and the denominator filtering value of $KPI_0$ correspond to one KPI, that is, $KPI_0$, and $KPI_0$ may be a call drop rate. The numerator filtering value of $KPI_1$ and the denominator filtering value of $KPI_1$ correspond to another KPI, that is, $KPI_1$, and $KPI_1$ may be a call completion rate. The energy saving gain value in Table 1 is an energy saving parameter value. The energy saving gain value may be a value obtained after power saving degree filtering, and there is no numerator filtering value or denominator filtering value. The evaluation value is obtained based on the KPI parameter values and energy saving parameter values in a same row.

$KPI_0$ and $KPI_1$ are KPI information monitored by the base station. The base station sends the KPI information to the load threshold determining apparatus, and the load threshold determining apparatus filters the KPI information to obtain KPI parameter values in the record table. After the energy saving information monitored by the base station is sent to the load threshold determining apparatus, the load threshold determining apparatus filters the energy saving information to obtain the energy saving parameter value in the record table.

It may be understood that a quantity of KPIs corresponding to all KPI parameter values recorded in the record table is not limited to Table 1. That is, the record table records KPI parameter values corresponding to KPIs that are actually monitored. A quantity of energy saving parameters corresponding to all energy saving parameter values recorded in the record table is not limited to Table 1. That is, the record table records energy saving parameter values corresponding to energy saving parameters that are actually monitored. Table 1 is merely a possible record table.

In the initialization phase, each KPI parameter value and each energy saving parameter value that correspond to each preselected load threshold and that are recorded in the record table are obtained after filtering based on the KPI information and the energy saving information that are obtained in the initialization phase when the load threshold of the cell is each preselected load threshold. In this case, the record table may be referred to as an initialization record table.

An evaluation value corresponding to each preselected load threshold is obtained based on the KPI parameter value and the energy saving parameter value that are recorded in the initialization record table, and a target load threshold of the cell in a first load update periodicity is determined in the plurality of preselected load thresholds based on the evaluation values. The target load threshold in the first load update periodicity is a load threshold that is set for the cell in the first load update periodicity. In other words, each load update periodicity corresponds to one target load threshold.

Because each load update periodicity corresponds to one target load threshold, if a target load threshold of an $i^{th}$ periodicity (that is, an $i^{th}$ load update periodicity) is a preselected load threshold j, and after the $i^{th}$ periodicity ends, a KPI parameter value corresponding to the preselected load threshold j in the record table is updated based on KPI information monitored when the load threshold of the cell in the $i^{th}$ periodicity is the preselected load threshold j, and an energy saving parameter value corresponding to the preselected load threshold j in the record table is updated based on energy saving information monitored when the load threshold of the cell in the $i^{th}$ periodicity is the preselected load threshold j, to obtain a new record table. In this case, information used to obtain an evaluation value corresponding to each preselected load threshold in an $(i+1)^{th}$ periodicity is information recorded in the new record table.

With reference to the foregoing description of the record table, the following describes, by using an adjacent first periodicity and second periodicity (the second periodicity is a next periodicity of the first periodicity) as an example, a process of determining the target load threshold of the cell in the second periodicity. The first periodicity and the second periodicity are any two adjacent periodicities.

First, an evaluation value corresponding to each preselected load threshold in the first periodicity is obtained. The obtaining an evaluation value corresponding to each preselected load threshold in the first periodicity includes:

for a preselected load threshold, determining, based on a first KPI parameter value set, a second KPI parameter value set, a first energy saving parameter value set, and a second energy saving parameter value set, an evaluation value corresponding to the preselected load threshold in the first periodicity, where the first KPI parameter value set is a set of KPI parameter values that correspond to the preselected load threshold and that are recorded in a first record table, the second KPI parameter value set is a set of KPI parameter values that correspond to the minimum load threshold and that are in the first record table, the first energy saving parameter value set is a set of energy saving parameter values that correspond to the preselected load threshold and that are in the first record table, and the second energy saving parameter value set is a set of energy saving parameter values that correspond to the minimum load threshold and that are in the first record table.

The "determining, based on a first KPI parameter value set, a second KPI parameter value set, a first energy saving parameter value set, and a second energy saving parameter value set, an evaluation value corresponding to the preselected load threshold in the first periodicity" includes:

determining, based on the first KPI parameter value set and the second KPI parameter value set, a KPI evaluation value of the cell and a KPI evaluation value of a cluster in which the cell is located: determining an energy saving evaluation value of the cell based on the first energy saving parameter value set and the second energy saving parameter value set; and obtaining, based on the KPI evaluation value of the cell, the KPI evaluation value of the cluster in which the cell is located, and the energy saving evaluation value of the cell, the evaluation value corresponding to the preselected load threshold in the first periodicity.

Specifically, in a manner, an evaluation value $R_1$ corresponding to the preselected load threshold in the first periodicity may be obtained by using the following formula:

$$R_1 = R_{1\_CellKPI} \times R_{1\_CluslerKPI} \times R_{1\_Traffic}$$

$R_{1\_CellKPI}$ is the KPI evaluation value of the cell, $R_{1\_ClusterKPI}$ is the KPI evaluation value of the cluster in which the cell is located, and $R_{1\_Traffic}$ is the energy saving evaluation value of the cell.

In this case, the first record table is an updated record table obtained after the following steps b1 to b2 are performed.

b1. Obtain each target KPI parameter value and each target energy saving parameter value of the cell when a load threshold of the cell is a first load threshold in a third periodicity, where the first load threshold is a target load threshold of the cell in the third periodicity, and the third periodicity is a previous periodicity of the first periodicity.

The first load threshold is a specified load threshold of the cell in the third periodicity.

b2. Update each KPI parameter value that corresponds to the first load threshold and that is recorded in a current record table to each target KPI parameter value, and update each energy saving parameter value that corresponds to the first load threshold and that is recorded in the current record table to each target energy saving parameter value, to obtain an updated record table.

The following separately describes a method for obtaining each of the KPI evaluation value of the cell, that is, $R_1\_CellKPI$, the KPI evaluation value of the cluster in which the cell is located, that is, $R_1\_ClusterKPI$, and the energy saving evaluation value of the cell, that is, $R_1\_Traffic$.

First, the method for obtaining the energy saving evaluation value of the cell, that is, $R_1\_Traffic$, is described.

In a manner, $R_1\_Traffic$ may be obtained in the following manner:

$$R_1\_Traffic = 1 + (Traffic_1 - Traffic_0)/Traffic_0,$$

$Traffic_1$ is an energy saving parameter value in the first energy saving parameter set, that is, the energy saving parameter value that corresponds to the preselected load threshold and that is recorded in the first record table. For example, when an energy saving parameter is an energy saving gain, $Traffic_1$ is the energy saving gain value that corresponds to the preselected load threshold and that is recorded in the first record table. $Traffic_0$ is an energy saving parameter value in the second energy saving parameter set, that is, the energy saving parameter value that corresponds to the minimum load threshold and that is recorded in the first record table. For example, when the energy saving parameter is an energy saving gain, $Traffic_0$ is the energy saving gain value that corresponds to the minimum load threshold and that is recorded in the first record table. If $Traffic_0$ is 0, $R_1\_Traffic$ is a fixed value, for example, 1.

Second, the method for obtaining the KPI evaluation value of the cell, that is, $R_1\_CellKPI$ is described.

There are two types of KPIs for the cell. One type is preferentially as small as possible and is referred to as a first-type KPI in this embodiment. For example, a call drop rate is a first-type KPI. The other type is preferentially as large as possible and is referred to as a second-type KPI in this embodiment. For example, a call completion rate is a second-type KPI. It may be understood that KPIs corresponding to all the KPI parameter values recorded in the record table may all be first-type KPIs, or may all be second-type KPIs, or some of the KPIs may be first-type KPIs and some may be second-type KPIs. For example, the KPI parameter values recorded in the record table correspond to two KPIs; one KPI is a call completion rate, and the other KPI is a handover success rate. The two KPIs both are second-type KPIs.

In this case, the "determining a KPI evaluation value of the cell based on the first KPI parameter value set and the second KPI parameter value set" includes the following (1) to (3):

(1) For a first-type KPI, obtain the first-type KPI based on the following method:

obtaining a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a difference between the first ratio and the second ratio is greater than a first absolute deterioration threshold, determining that a fifth target KPI evaluation value that is of the cell and that corresponds to the first-type KPI is a second preset value, or if a difference between the first ratio and the second ratio is less than or equal to the first absolute deterioration threshold of the cell, determining that the fifth target KPI evaluation value is a first preset value, where the first absolute deterioration threshold is a third standard deviation multiplied by a first coefficient, and the third standard deviation is a standard deviation of a plurality of first-type KPIs of the cell within first preset duration before the first periodicity.

Specifically, for each first-type KPI, the fifth target KPI evaluation value that is of the cell and that corresponds to the first-type KPI is obtained based on the foregoing method. In other words, in a manner, if the first preset value is 1, and the second preset value is 0, for an m first-type KPI, a fifth target KPI evaluation value $R_{11}\_CellKPI_m$ of the cell corresponding to the $m^{th}$ first-type KPI may be obtained by using the following formula:

$$R_{11}\_CellKPI_m = [(KPI_m - KPI_{m0}) > X_{am}?0:1].$$

$KPI_m$ is a ratio between a numerator filtering value and a denominator filtering value that correspond to the $m^{th}$ first-type KPI and that are in the first KPI parameter value set, that is, a first ratio; $KPI_{m0}$ is a ratio between a numerator filtering value and a denominator filtering value that correspond to the $m^{th}$ first-type KPI and that are in the second KPI parameter value set, that is, a second ratio; $X_{am}$ is a first absolute deterioration threshold corresponding to the $m^{th}$ first-type KPI; and $1 \leq m \leq M$.

The first absolute deterioration threshold corresponding to the $m^{th}$ first-type KPI may be a third standard deviation multiplied by a first coefficient, where the third standard deviation is a third standard deviation of a plurality of $m^{th}$ first-type KPIs of the cell within first preset duration before the first periodicity. The first coefficient may be 2, the first preset duration may be one week, and the $m^{th}$ first-type KPI may be an hour-level KPI. In other words, one $m^{th}$ first-type KPI is obtained in each hour within one week. In this case, the plurality of $m^{th}$ first-type KPIs are $24 \times 7$ $m^{th}$ first-type KPIs.

For example, if the $m^{th}$ first-type KPI is call drop rate, $KPI_m$ is a ratio between a numerator filtering value and a denominator filtering value that correspond to the call drop rate and that are in the first KPI parameter value set, that is, a ratio between a numerator filtering value and a denominator filtering value that correspond to the call drop rate corresponding to the preselected load threshold and that are recorded in the first record table; $KPI_{m0}$ is a ratio between a numerator filtering value and a denominator filtering value that correspond to the call drop rate and that are in the second KPI parameter value set, that is, a ratio between a numerator filtering value and a denominator filtering value that correspond to the call drop rate corresponding to the minimum load threshold and that are recorded in the first record table; and $X_{am}$ is the first coefficient multiplied by a standard deviation of a plurality of call drop rates of the cell within the first preset duration before the first periodicity. The numerator filtering value corresponding to the call drop rate is a value obtained after numerator filtering of the call drop rate, and the denominator filtering value corresponding to the call drop rate is a value obtained after denominator filtering of the call drop rate.

Because the first absolute deterioration threshold corresponding to the $m^{th}$ first-type KPI is a positive value, if $KPI_m-KPI_{m0}$ is greater than $X_{am}$, it indicates that not only $KPI_m$ is greater than $KPI_{m0}$, but also a value by which $KPI_m$ is greater than $KPI_{m0}$ is further greater than $X_{am}$. In addition, because the first-type KPI is preferentially as small as possible, it indicates that when the load threshold of the cell is the preselected threshold, the $m^{th}$ first-type KPI deteriorates compared with when the load threshold of the cell is the minimum load threshold. In this case, $R_{11}\_CellKPI_m$ is set to 0. If $KPI_m-KPI_{m0}$ is less than $X_{am}$, it indicates that $KPI_m$ is not much greater than $KPI_{m0}$, or $KPI_m$ is less than or equal to $KPI_{m0}$. In addition, because the first-type KPI is preferentially as small as possible, it indicates that when the load threshold of the cell is the preselected threshold, a degree of deterioration of the $m^{th}$-type first-type KPI falls within an acceptable range or does not change or improves compared with when the load threshold of the cell is the minimum load threshold. In this case, $R_{11}\_CellKPI_m$ is equal to 1.

(2) For a second-type KPI, obtain the second-type KPI based on the following method:

obtaining a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set; and if a difference between the third ratio and the fourth ratio is less than a second absolute deterioration threshold of the cell, determining that a sixth target KPI evaluation value that is of the cell and that corresponds to the second-type KPI is a second preset value; or if a difference between the third ratio and the fourth ratio is greater than or equal to the second absolute deterioration threshold, determining that the sixth target KPI evaluation value is a first preset value, where the second absolute deterioration threshold is an opposite number of a product of a fourth standard deviation and a first coefficient, and the third standard deviation is a standard deviation of a plurality of second-type KPIs of the cell within first preset duration before the first periodicity.

Specifically, for each second-type KPI, the sixth target KPI evaluation value that is of the cell and that corresponds to the second-type KPI is obtained based on the foregoing method. In other words, in a manner, if the first preset value is 1, and the second preset value is 0, for an $n^{th}$ second-type KPI, a sixth target KPI evaluation value $R_{12}\_CellKPI_n$ that is of the cell and that corresponds to the $n^{th}$ second-type KPI may be obtained by using the following formula:

$R_{12}\_CellKPI_n=[(KPI_n-KPI_{n0})<X_{an}?0:1]$.

$KPI_n$ is a ratio between a numerator filtering value and a denominator filtering value that correspond to the $n^{th}$ second-type KPI and that are in the first KPI parameter value set, that is, a third ratio; $KPI_{n0}$ is a ratio between a numerator filtering value and a denominator filtering value that correspond to the $n^{th}$ second-type KPI and that are in the second KPI parameter value set, that is, a fourth ratio, $X_{an}$ is a second absolute deterioration threshold corresponding to the $n^{th}$ second-type KPI; and $1 \leq n \leq N$.

The second absolute deterioration threshold may be an opposite number of a product of a standard deviation and a first coefficient, where the standard deviation is a standard deviation of a plurality of $n^{th}$ second-type KPIs of the cell within first preset duration before the first periodicity. The first coefficient may be 2, the first preset duration may be one week, and the $n^{th}$ second-type KPI may be at an hour level. In this case, the plurality of $n^{th}$ second-type KPIs are $24 \times 7$ $n^{th}$ second-type KPIs.

For example, if the $n^{th}$ second-type KPI is a call completion rate, $KPI_n$ is a ratio between a numerator filtering value and a denominator filtering value that correspond to the call completion rate and that are in the first KPI parameter value set, that is, a ratio between a numerator filtering value and a denominator filtering value that correspond to the call completion rate corresponding to the preselected load threshold and that are recorded in the first record table; $KPI_{n0}$ is a ratio between a numerator filtering value and a denominator filtering value that correspond to the call completion rate and that are in the second KPI parameter value set, that is, a ratio between a numerator filtering value and a denominator filtering value that correspond to the call completion rate corresponding to the minimum load threshold and that are recorded in the first record table; and $X_{an}$ is an opposite number of a product of a standard deviation and the first coefficient, where the standard deviation is a standard deviation of a plurality of call completion rates of the cell within the first preset duration before the first periodicity.

Because the second absolute deterioration threshold corresponding to the $n^{th}$ second-type KPI is a negative value, if $KPI_n-KPI_{n0}$ is less than $X_{an}$, it indicates that not only $KPI_n$ is less than $KPI_{n0}$, but also a value by which $KPI_n$ is less than $KPI_{n0}$ is further greater than $-X_{an}$. In addition, because the second-type KPI is preferentially as large as possible, it indicates that when the load threshold of the cell is the preselected threshold, the $n^{th}$ second-type KPI deteriorates compared with that when the load threshold of the cell is the minimum load threshold. In this case, $R_{12}\_CellKPI_n$ is equal to 0. If $KPI_n-KPI_{n0}$ is greater than $X_{an}$, it indicates that $KPI_n$ is not much less than $KPI_{n0}$, or $KPI_n$ is greater than $KPI_{n0}$. In addition, because the second-type KPI is preferentially as large as possible, it indicates that when the load threshold of the cell is the preselected threshold, a degree of deterioration of the $n^{th}$ second-type KPI falls within an acceptable range or does not change or improves compared with that when the load threshold of the cell is the minimum load threshold. In this case, $R_{12}\_CellKPI_n$ is set to 1.

(3) Obtain the KPI evaluation value of the cell based on each fifth target KPI evaluation value and/or each sixth target KPI evaluation value.

In a manner, the KPI evaluation value $R_1\_CellKPI$ of the cell may be obtained by using the following formula:

$$R_1\_CellKPI = \prod_1^M R_{11}\_CellKPI_m \times \prod_1^N R_{12}\_CellKPI_n.$$

Therefore, $R_1\_CellKPI$ is 0, provided that one of $R_{11}\_CellKPI_n$ and $R_{12}\_CellKPI_n$ is 0. If $R_1\_CellKPI$ is 0, the evaluation value corresponding to the preselected load threshold is 0.

Then, the method for obtaining the KPI evaluation value $R_1\_ClusterKPI$ of the cluster in which the cell is located is described.

The determining, based on the first KPI parameter value set and the second KPI parameter value set, the KPI evaluation value of the cluster in which the cell is located includes:
(1) for a first-type KPI, determining, based on KPI parameter values corresponding to the first-type KPI in the first KPI parameter value set and the second KPI parameter value set, a first target KPI evaluation value that is of the cluster and that corresponds to the first-type KPI;
(2) for a second-type KPI, determining, based on KPI parameter values corresponding to the second-type KPI in the first KPI parameter value set and the second KPI parameter value set, a second target KPI evaluation value that is of the cluster and that corresponds to the second-type KPI; and
(3) obtaining, based on each first target KPI evaluation value and/or each second target KPI evaluation value, the KPI evaluation value of the cluster in which the cell is located.

For (1), if the preselected load threshold is not the target load threshold corresponding to the first periodicity, the first target KPI evaluation value that is of the cluster and that corresponds to the first-type KPI is determined based on c1 to c2, or if the preselected load threshold is the target load threshold corresponding to the first periodicity, the first target KPI evaluation value that is of the cluster and that corresponds to the first-type KPI is determined based on c3 to c5.

First, if the preselected load threshold is not the target load threshold corresponding to the first periodicity, a method for determining the first target KPI evaluation value that is of the cluster and that corresponds to the first-type KPI is described.

c1. Obtain a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set.

c2. If a first difference between the first ratio and the second ratio is less than or equal to 0, determine that the first target KPI evaluation value is the first preset value; or if the first difference is greater than 0, determine that the first target KPI evaluation value is a third target KPI evaluation value, where the third target KPI evaluation value is a KPI evaluation value that is of the cluster, that corresponds to the first-type KPI, and that corresponds to the preselected load threshold in the third periodicity, and the third periodicity is a previous periodicity of the first periodicity.

Specifically, for each first-type KPI, the first target KPI evaluation value of the cluster in which the cell is located corresponding to the first-type KPI is obtained based on the foregoing method. In other words, in a manner, if the first preset value is 1, for an $m^{th}$ first-type KPI a first target KPI evaluation value $R_1\_ClusterKPI_m$ of a cluster in which the cell is located corresponding to the in first-type KPI may be obtained by using the following formula:

$$R_1\_ClusterKPI_m=[(KPI_m-KPI_{m0})\geq 0?1:pr_1].$$

$KPI_m$ is a ratio between a numerator filtering value and a denominator filtering value that correspond to the $m^{th}$ first-type KPI and that are in the first KPI parameter value set, that is, a first ratio; $KPI_{m0}$ is a ratio between a numerator filtering value and a denominator filtering value that correspond to the $m^{th}$ first-type KPI and that are in the second KPI parameter value set, that is, a second ratio; $pr_1$ is a KPI evaluation value that is of the cluster, that corresponds to the $m^{th}$ first-type KPI, and that corresponds to the preselected load threshold in the third periodicity, that is, a third target evaluation value corresponding to the $m^{th}$ first-type KPI; and $1\leq m\leq M$.

In the initialization phase, $R_{11}\_ClusterKPI_m$ is equal to 1.

If $KPI_m-KPI_{m0}$ is greater than 0, it indicates that $KPI_m$ is greater than $KPI_{m0}$. Because the first-type KPI is preferentially as small as possible, it indicates that when the load threshold of the cell is the preselected threshold, the $m^{th}$ first-type KPI deteriorates compared with that when the load threshold of the cell is the minimum load threshold. In this case, $R_{11}\_CellKPI_m$ is set to pr. If $KPI_m-KPI_{m0}$ is less than 0, it indicates that $KPI_m$ is less than or equal to $KPI_{m0}$. In addition, because the first-type KPI is preferentially as small as possible, it indicates that when the load threshold of the cell is the preselected threshold, a KPI that is of the cluster and that corresponds to the m first-type KPI does not change or improves compared with that when the load threshold of the cell is the minimum load threshold. In this case, $R_{11}\_ClusterKPI_m$ is equal to 1.

Second, if the preselected load threshold is the target load threshold corresponding to the first periodicity, a method for determining the first target KPI evaluation value that is of the cluster and that corresponds to the first-type KPI is described.

c3. Obtain a first value based on parameters that correspond to the first-type KPI and that are in first KPI parameter value sets corresponding to all cells included in the cluster in which the cell is located; and obtain a second value based on parameters that correspond to the first-type KPI and that are in second KPI parameter value sets corresponding to all the cells included in the cluster in which the cell is located.

Specifically, for the first value, numerator filtering values that correspond to the first-type KPI in the first KPI parameter value set and that respectively correspond to all the cells included in the cluster in which the cell is located are added to obtain a first sum, and denominator filtering values that correspond to the first-type KPI in the first KPI parameter value set and that respectively correspond to all the cells included in the cluster in which the cell is located are added, to obtain a second sum. A ratio of the first sum to the second sum is the first value. The first value is a first value corresponding to the first periodicity.

For example, the first-type KPI is a call drop rate, the cluster in which the cell is located includes a cell A and a cell B, a numerator filtering value and a denominator filtering value that correspond to the call drop rate and that are in the first KPI parameter value set corresponding to the preselected load threshold in the first record table corresponding to the cell A are respectively 1 and 100, and a numerator filtering value and a denominator filtering value that correspond to the call drop rate and that are in the second KPI parameter value set corresponding to the preselected load threshold in the first record table corresponding to the cell B are respectively 2 and 51. In this case, the first sum is equal to 1+2=3, the second sum is equal to 100+51=151, and the first value is equal to 3/151.

For the second value, numerator filtering values that correspond to the first-type KPI in the second KPI parameter value set and that correspond to all the cells included in the cluster in which the cell is located are added to obtain a third sum, and denominator filtering values that correspond to the first-type KPI in the second KPI parameter value set and that correspond to all the cells included in the cluster in which the cell is located are added, to obtain a fourth sum. A ratio of the third sum to the fourth sum is the second value.

c4. If a value obtained by dividing a difference between the first value and the second value by the first value is less than or equal to a third value, determine that the first target KPI evaluation value is the third target KPI evaluation value, where the third value is a preset multiple of a ratio of a first standard deviation to a first average value, the first standard deviation is a standard deviation of first values corresponding to a preset quantity of periodicities before the first periodicity, and the first average value is an average value of the first values corresponding to the preset quantity of periodicities before the first periodicity.

Specifically, if the first value is 0, the first target KPI evaluation value that is of the cluster and that corresponds to the first-type KPI is 1.

The preset multiple may be 2 times, and the preset quantity may be 10. If the preset quantity is 10, the first standard deviation is a standard deviation of 10 first values respectively corresponding to the 10 periodicities before the first periodicity, and the first average value is an average value of the 10 first values respectively corresponding to the 10 periodicities before the first periodicity. A method for obtaining a first value corresponding to each periodicity is the same as the method for obtaining the first value corresponding to the first periodicity in c3. For example, a first value corresponding to the third periodicity in a periodicity before the week is a ratio of a fifth sum to a sixth sum. The fifth sum is a sum of numerator filtering values that correspond to the first-type KPI and that are recorded in all first record tables corresponding to all the cells included in the cluster in which the cell is located in the third periodicity. The sixth sum is a sum of denominator filtering values that correspond to the first-type KPI and that are recorded in all the first record tables corresponding to all the cells included in the cluster in which the cell is located in the third periodicity.

If a quantity of periodicities before the first periodicity is less than the preset quantity, the third value is equal to the preset multiple of a ratio of an original standard deviation to an original average value.

A process of obtaining the original standard deviation and the original average value is: obtaining S first-type KPIs respectively corresponding to L cells included in the cluster in which the cell is located within third preset duration before the first periodicity, and a KPI has L×S first-type KPIs, and converting each first-type KPI into one numerator filtering value and one denominator filtering value. S first-type KPIs corresponding to one cell correspond to S time periods. Numerator filtering values corresponding to L first-type KPIs in a same time period that correspond to the L cells are added, to obtain a seventh sum. Denominator filtering values corresponding to the L first-type KPIs in the same time period that correspond to the L cells are added, to obtain an eighth sum. A ratio of the seventh sum to the eighth sum is referred to as an original ratio. S original ratios may be obtained in total. In this case, a standard deviation of the S original ratios is the original standard deviation, and an average value of the S original ratios is the original average value.

c5. If a value obtained by dividing a difference between the first value and the second value by the first value is greater than the third value and the cell is in a first cell set, determine that the first target KPI evaluation value is a second preset value; or if a value obtained by dividing a difference between the first value and the second value by the first value is greater than the third value and the cell is not in a first cell set, determine that the first target KPI evaluation value is the third target KPI evaluation value, where the first cell set is a set of W cells with first differences ranking top W after first differences are sorted in descending order in cells included in the cluster with the first differences greater than 0.

Specifically, a method for obtaining the first difference is described above in c1 to c2, and the second preset value may be 0.

When the preselected load threshold is the target load threshold corresponding to the first periodicity, for each first-type KPI, the first target KPI evaluation value that corresponds to the corresponding first-type KPI and that is of the cluster in which the cell is located is obtained based on the foregoing method.

For (2), if the preselected load threshold is not the target load threshold corresponding to the first periodicity, the second target KPI evaluation value that is of the cluster and that corresponds to the second-type KPI is determined based on d1 to d2, or if the preselected load threshold is the target load threshold corresponding to the first periodicity, the second target KPI evaluation value that is of the cluster and that corresponds to the second-type KPI is determined based on d3 to d5.

First, if the preselected load threshold is not the target load threshold corresponding to the first periodicity, a method for determining the second target KPI evaluation value that is of the cluster and that corresponds to the second-type KPI is described.

d1. Obtain a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set.

d2. If a second difference between the third ratio and the fourth ratio is greater than or equal to 0, determine that the second target KPI evaluation value is the first preset value, or if the second difference is less than 0, determine that the second target KPI evaluation value is a fourth target KPI evaluation value, where the fourth target KPI evaluation value is a KPI evaluation value that is of the cluster, that corresponds to the second-type KPI, and that corresponds to the preselected load threshold in the third periodicity, and the third periodicity is a previous periodicity of the first periodicity.

Specifically, for each second-type KPI, the second target KPI evaluation value that is of the cluster in which the cell is located and that corresponds to the second-type KPI is obtained based on the foregoing method. In other words, in a manner, if the first preset value is 1, for an $n^{th}$ second-type KPI, a second target KPI evaluation value $R_{12\_}ClusterKPI_n$ that is of a cluster in which the cell is located and that corresponds to the $n^{th}$ second-type KPI may be obtained by using the following formula:

$$R_{12\_}ClusterKPI_n = [(KPI_n - KPI_{n0}) \leq 0 ? 1 : pr_2].$$

$KPI_n$ is a ratio between a numerator filtering value and a denominator filtering value that correspond to the $n^{th}$ second-type KPI and that are in the first KPI parameter value set, that is, a third ratio; $KPI_{n0}$ is a ratio between a numerator filtering value and a denominator filtering value that correspond to the $n^{th}$ second-type KPI and that are in the second KPI parameter value set, that is, a fourth ratio: $pr_2$ is a KPI evaluation value that is of the cluster, that corresponds to the $n^{th}$ second-type KPI, and that corresponds to the preselected load threshold in the third periodicity, that is, a fourth target evaluation value corresponding to the $n^{th}$ second-type KPI; and $1 \leq n \leq N$.

In the initialization phase, $R_{12}\_ClusterKPI_n$ is equal to 1.

If $KPI_n - KPI_{n0}$ is less than 0, it indicates that $KPI_n$ is less than $KPI_{n0}$. Because the second-type KPI is preferentially as large as possible, it indicates that when the load threshold of the cell is the preselected threshold, the $n^{th}$ second-type KPI of the cluster deteriorates compared with that when the load threshold of the cell is the minimum load threshold. In this case, $R_{12}\_ClusterKPI_n$ is set to pr. If $KPI_n - KPI_{n0}$ is greater than 0, it indicates that $KPI_n$ is greater than or equal to $KPI_{n0}$. In addition, because the second-type KPI is preferentially as large as possible, it indicates that when the load threshold of the cell is the preselected threshold, the $n^{th}$ second-type KPI of the cluster does not change or improves compared with that when the load threshold of the cell is the minimum load threshold. In this case, $R_{12}\_ClusterKPI_n$ is equal to 1.

Second, if the preselected load threshold is the target load threshold corresponding to the first periodicity, a method for determining the second target KPI evaluation value that is of the cluster and that corresponds to the second-type KPI is described.

d3. Obtain a fourth value based on parameters that correspond to the second-type KPI and that are in first KPI parameter value sets corresponding to all cells included in the cluster in which the cell is located; and obtain a fifth value based on parameters that correspond to the second-type KPI and that are in second KPI parameter value sets corresponding to all the cells included in the cluster in which the cell is located.

d4. If a value obtained by dividing a second difference between the fourth value and the fifth value by the fourth value is greater than or equal to a sixth value, determine that the second target KPI evaluation value in the first periodicity is the fourth target KPI evaluation value, where the sixth value is an opposite number of a preset multiple of a ratio of a second standard deviation to a second average value, the second standard deviation is a standard deviation of fourth values corresponding to a preset quantity of periodicities before the first periodicity, and the second average value is an average value of the fourth values corresponding to the preset quantity of periodicities before the first periodicity.

d5. If a value obtained by dividing a difference between the fourth value and the fifth value by the fourth value is less than a sixth value and the cell is in a second cell set, determine that the second target KPI evaluation value is a second preset value; or if a value obtained by dividing a difference between the fourth value and the fifth value by the fourth value is less than or equal to a sixth value and the cell is not in a second cell set, determine that the second target KPI evaluation value is the fourth target KPI evaluation value, where the second cell set is a set of W cells with second differences ranking top W after absolute values of second differences are sorted in descending order in cells included in the cluster with the second differences less than or equal to 0.

For d3 to d5, refer to descriptions in c3 to c5. Details are not described herein again.

For (3), the KPI evaluation value of the cluster in which the cell is located is obtained based on each first target KPI evaluation value and/or each second target KPI evaluation value.

In a manner, the KPI evaluation value $R_1\_ClusterKPI$ of the cell may be obtained by using the following formula:

$$R_1\_ClusterKPI = \prod_1^M R_{11}\_ClusterKPI_m \times \prod_1^N R_{12}\_ClusterKPI_n.$$

It may be understood that, in the first periodicity, an evaluation value corresponding to each preselected load threshold is obtained based on the foregoing method. In this way, the evaluation values corresponding to all the preselected load thresholds in the first periodicity can be obtained. After the evaluation value corresponding to each preselected load threshold in the first periodicity is obtained, a target load threshold in the second periodicity may be determined based on all obtained evaluation values.

Specifically, the determining a target load threshold of the cell in the second periodicity based on all evaluation values includes the following steps:

(1) Determine a first probability that a first preselected load threshold is determined as the target load threshold of the cell in the second periodicity, where the first preselected load threshold is a preselected load threshold corresponding to a largest evaluation value among all the evaluation values.

the determining a first probability that the first preselected load threshold is determined as the target load threshold of the cell in the second periodicity includes: determining a third probability based on a periodicity sequence number of the second periodicity and a quantity of preselected load thresholds, and determining a difference between 1 and the third probability as the first probability.

The first probability Pt may be obtained by using the following formulas:

$P_1 = 1 - P_3$, and $$P_3 = \max\left[\min\left(\frac{1}{SQRT(t)}, \frac{G-1}{G}\right), 0.1\right].$$

SQRT(t) is the periodicity sequence number of the second periodicity, that is, a sequence number of a load threshold update periodicity being the second periodicity, and G is the quantity of preselected load thresholds.

(2) Determine a second probability that a second preselected load threshold is determined as the target load threshold of the cell in the second periodicity, where the second preselected load threshold is a load threshold other than the first preselected load threshold in the plurality of preselected load thresholds.

The second probability $P_2$ may be obtained by using the following formula:

$$P_2 = \frac{P_3}{G-1}.$$

(3) Determine the target load threshold of the cell in the second periodicity based on the first probability and the second probability.

The target load threshold of the cell in the second periodicity is determined from the plurality of preselected load thresholds based on the foregoing first probability that the first preselected load threshold is selected as the target load threshold and the foregoing second probability that the second preselected load threshold is selected as the target load threshold in the second periodicity.

For example, the first probability is 90%, the second probability is 10%, a probability that the first preselected load threshold is the target load threshold in the second periodicity is 90%, and a probability that any second preselected load threshold is the target load threshold in the second periodicity is 10%.

The second periodicity starts after the target load threshold in the second periodicity is determined, and the load threshold in the second periodicity is set to the target load threshold. After the second periodicity ends, the KPI parameter value corresponding to the target load threshold in the foregoing first record table is updated based on a KPI monitored when the load threshold in the second periodicity is the target load threshold, and the energy saving parameter value corresponding to the target load threshold in the foregoing first record table is updated based on the energy saving parameter value monitored when the load threshold in the second periodicity is the target load threshold, to obtain an updated second record table. In this case, information used to obtain an evaluation value corresponding to each preselected load threshold in the fourth periodicity is information recorded in the second record table, and the fourth periodicity is a next periodicity of the second periodicity.

Finally, the foregoing steps b1 to b2 are described.

b1. Obtain each target KPI parameter value and each target energy saving parameter value of the cell when a load threshold of the cell is a first load threshold in a third periodicity, where the first load threshold is a target load threshold of the cell in the third periodicity, and the third periodicity is a previous periodicity of the first periodicity.

b2. Update each KPI parameter value that corresponds to the first load threshold and that is recorded in a current record table to each target KPI parameter value, and update each energy saving parameter value that corresponds to the first load threshold and that is recorded in the current record table to each target energy saving parameter value.

Specifically, before the obtaining each target KPI parameter value of the cell when a load threshold of the cell is a first load threshold in a third periodicity in b1, the method further includes e1 to e3.

e1. Obtain each original KPI and each original energy saving value when the load threshold of the cell is the first load threshold in the third periodicity.

A KPI monitored by the base station when the load threshold of the cell is the first load threshold in the third periodicity is the original KPI, and the load threshold determining apparatus obtains each original KPI from the base station.

The original KPI is a KPI of a corresponding numerator filtering value and a corresponding denominator filtering value that are obtained without filtering. For example, when the load threshold of the cell is the first load threshold in the third periodicity, the call drop rate monitored by the base station is an original KPI.

e2. For a first-type KPI in the original KPIs, determine whether an absolute value of a difference between a first original KPI and a third average value corresponding to the first-type KPI is greater than a seventh value, and if an obtained determining result is yes, determine that the first original KPI is a normal value, where the third average value is a historical average value of the first original KPI, the seventh value is equal to a second coefficient multiplied by a fifth standard deviation, and the fifth standard deviation is a standard deviation of a plurality of first-type KPIs of the cell within second preset duration before the third periodicity.

Whether an original KPI corresponding to each first-type KPI is a normal value is determined based on the method in e2. For obtaining of the fifth standard deviation, refer to the foregoing method for obtaining the third standard deviation. Details are not described herein again. Optionally, the second coefficient may be 4.

e3. For a second-type KPI in the original KPIs, determine whether an absolute value of a difference between a second original KPI and a fourth average value corresponding to the second-type KPI is less than an eighth value, and if an obtained determining result is yes, determine that the second original KPI is a normal value, where the fourth average value is a historical average value of the second original KPI, the eighth value is equal to an opposite number of a product of the second coefficient and a sixth standard deviation, and the sixth standard deviation is a standard deviation of a plurality of second-type KPIs of the cell within the second preset duration before the third periodicity.

For obtaining of the sixth standard deviation, refer to the foregoing method for obtaining the fourth standard deviation. For a specific implementation of e3, refer to e2. Details are not described herein again.

That is, for each KPI corresponding to the record table, a corresponding original KPI obtained through monitoring when the load threshold of the cell is the first load threshold in the third periodicity needs to be a normal value, and a related KPI parameter value in the record table is updated, to ensure accuracy of the evaluation value corresponding to each preselected load threshold.

In this case, for b1, the obtaining a target KPI parameter value of the cell when the load threshold of the cell is a first load threshold in a third periodicity includes the following steps.

Obtain each target KPI parameter value by using the following formula:

$$Q_{j,i}^1 = Q_{j,i-1}^1 + (h_i - Q_{j,i-1}^1)/n_{j,i}.$$

$Q_{j,i}^1$ is an $i^{th}$ target KPI parameter value, $Q_{j,i-1}^1$ is an $i^{th}$ KPI parameter value in KPI parameter values that correspond to the first load threshold and that are recorded in a current record table, and $n_{j,i}$ is a filtering factor corresponding to the first load threshold in the second periodicity. If $Q_{j,i}^1$ is a numerator filtering value, $h_i$ is a numerator of an original KPI corresponding to the $i^{th}$ target KPI parameter value. If $Q_{j,i}^1$ is a denominator filtering value, $h_i$ is a denominator of the original KPI corresponding to the $i^{th}$ target KPI parameter value.

Obtain each target energy saving parameter value by using the following formula:

$$Q_{j,i}^2 = Q_{j,i-1}^2 + (l_i - Q_{j,i-1}^2)/n_{j,i}.$$

$Q_{j,i}^2$ is an $i^{th}$ target energy saving parameter value. $Q_{j,i-1}^2$ is an $i^{th}$ energy saving parameter value in the KPI parameter values that correspond to the first load threshold and that are recorded in the current record table, $n_{j,i}$ is the filtering factor corresponding to the first load threshold in the second periodicity, and $l_i$ is an original energy saving value corresponding to the $i^{th}$ target energy saving parameter value.

A method for obtaining $n_{j,i}$ is as follows: If the periodicity sequence number of the second periodicity is less than a third preset value and there is a normal value in corresponding original values (the original KPI value and the original energy saving value), it is determined that the first filtering factor is equal to $n_{1j,i-1}+1$. If the periodicity sequence number of the second periodicity is less than the third preset value and/or there is no normal value in the original values, it is determined that the first filtering factor is equal to $n_{1j,i-1}$. $n_{1j,i-1}$ is a first filtering factor corresponding to the first load threshold of the cell in the third periodicity. The third preset value may be 150.

If the periodicity sequence number of the second periodicity is greater than the third preset value and there is a normal value in the original values, it is determined that the first filtering factor is equal to $$n_{1j,i-1} + 1 - n_{1j,i-1}/m.$$

If the periodicity sequence number of the second periodicity is greater than the third preset value and/or there is no normal value in the original values, it is determined that the first filtering factor is equal to $$\max(n_{1j,i-1} - n_{1j,i-1}/m, 1).$$

m is the third preset value.

If the periodicity sequence number of the second periodicity is less than or equal to a fourth preset value and there is a normal value in the original values, it is determined that the second filtering factor is equal to $n_{2j,i-1}+1$. If the periodicity sequence number of the second periodicity is less than or equal to the fourth preset value and/or there is no normal value in the original values, it is determined that the second filtering factor is equal to $n_{2j,i-1}$. $n_{2j,i-1}$ is a second filtering factor corresponding to the first load threshold of the cell in the third periodicity. The fourth preset value may be 230.

If the periodicity sequence number of the second periodicity is greater than the fourth preset value and there is a normal value in the original values, it is determined that the second filtering factor is equal to $$n_{2j,i-1} + 1 - n_{2j,i-1}/n.$$

If the periodicity sequence number of the second periodicity is greater than the fourth preset value and/or there is no normal value in the original values, it is determined that the second filtering factor is equal to $$\max(n_{2j,i-1} - n_{2j,i-1}/n, 1).$$

n is the fourth preset value.

If a first absolute value of a difference between a fifth preset value and the first filtering factor is less than or equal to a second absolute value of a difference between the fifth preset value and the second filtering factor, it is determined that $n_{j,i}$ s the first filtering factor. If the first absolute value is greater than the second absolute value, it is determined that $n_{j,i}$ is the second filtering factor.

An initial value of the filtering factor may be 1.

For b2, each KPI parameter value that corresponds to the first load threshold and that is recorded in the current record table is updated to each target KPI parameter value, and each energy saving parameter value that corresponds to the first load threshold and that is recorded in the current record table is updated to each target energy saving parameter value, to obtain the updated record table.

In this embodiment, the load threshold of the cell in the current periodicity is determined based on the evaluation value corresponding to each preselected load threshold of the cell in a previous load update periodicity. Because the evaluation value can be used to evaluate KPI information and energy saving information of the cell, the load threshold of the cell in the current periodicity is determined after the KPI information and the energy saving information of the cell are comprehensively considered. Therefore, the load threshold determined by using the method in this embodiment can both ensure a KPI and reduce energy consumption of the base station as much as possible.

The foregoing describes the load threshold determining method in this application with reference to FIG. 2 and FIG. 3. The following describes a load threshold determining apparatus with reference to FIG. 4 and FIG. 5.

Figure 4:
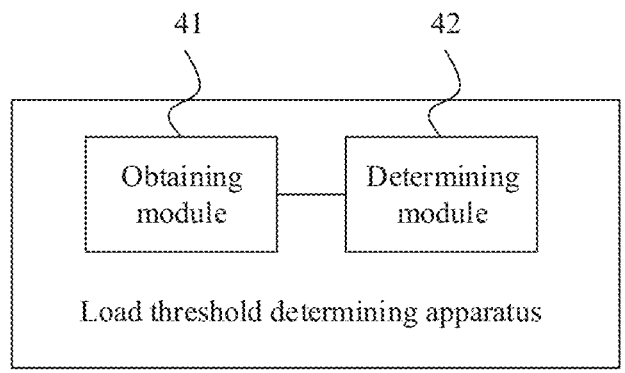
FIG. 4 is a schematic structural diagram of a load threshold determining apparatus according to an embodiment of this application.

FIG. 4 is a first schematic structural diagram of a load threshold determining apparatus according to an embodiment of this application. Referring to FIG. 4, the apparatus in this embodiment includes an obtaining module 41 and a determining module 42.

The obtaining module 41 is configured to obtain a plurality of preselected load thresholds of a cell.

The obtaining module 41 is further configured to obtain an evaluation value corresponding to each preselected load threshold in a first periodicity. Each evaluation value is used to evaluate key performance indicator KPI information and energy saving information of the cell.

The determining module 42 is configured to determine a target load threshold of the cell in a second periodicity based on all evaluation values. The target load threshold is a load threshold in the plurality of preselected load thresholds, and the second periodicity is a next periodicity of the first periodicity.

In a possible design, the obtaining module 41 is specifically configured to:
 obtain a maximum load threshold and a minimum load threshold of the cell; and
 obtain the plurality of preselected load thresholds based on the maximum load threshold and the minimum load threshold, where the plurality of preselected load thresholds include the maximum load threshold and the minimum load threshold.

In a possible design, the obtaining module 41 is specifically configured to:
 obtain parameter value groups respectively corresponding to a plurality of time periods of the cell, where one parameter value group includes a value of at least one first parameter corresponding to a corresponding time period of the cell, and the at least one first parameter includes load:
 based on the parameter value groups respectively corresponding to the plurality of time periods, determine a first relationship between at least one first parameter and a throughput rate, and determine M second relationships between the at least one first parameter and M KPIs, where M is a positive integer; and determine the maximum load threshold based on the first relationship and the M second relationships.

In a possible design, the obtaining module 41 is specifically configured to:

determine first load corresponding to a maximum value of a throughput rate corresponding to a first curve, where the first curve is a curve corresponding to the first relationship;

determine M second load corresponding to maximum values of M KPIs corresponding to M second curves, where the M second curves are curves corresponding to the M second relationships, and the second curves and the second relationships are in a one-to-one correspondence; and determine a smallest value in the first load and the M second load as the maximum load threshold.

In a possible design, the apparatus stores a record table used to record each KPI parameter value, each energy saving parameter value, and an evaluation value that correspond to each preselected load threshold.

The obtaining module 41 is further configured to: before obtaining the evaluation value corresponding to each preselected load threshold in the first periodicity, obtain each target KPI parameter value and each target energy saving parameter value of the cell when a load threshold of the cell is a first load threshold in a third periodicity, where the first load threshold is a target load threshold of the cell in the third periodicity, and the third periodicity is a previous periodicity of the first periodicity, and update each KPI parameter value that corresponds to the first load threshold and that is recorded in a current record table to each target KPI parameter value, and update each energy saving parameter value that corresponds to the first load threshold and that is recorded in the current record table to each target energy saving parameter value, to obtain an updated record table.

In a possible design, the obtaining module 41 is specifically configured to:

for a preselected load threshold, determine, based on a first KPI parameter value set, a second KPI parameter value set, a first energy saving parameter value set, and a second energy saving parameter value set, an evaluation value corresponding to the preselected load threshold in the first periodicity, where the first KPI parameter value set is a set of KPI parameter values that correspond to the preselected load threshold and that are recorded in the updated record table, the second KPI parameter value set is a set of KPI parameter values that correspond to the minimum load threshold and that are in the updated record table and, the first energy saving parameter value set is a set of energy saving parameter values that correspond to the preselected load threshold and that are in the updated record table, and the second energy saving parameter value set is a set of energy saving parameter values that correspond to the minimum load threshold and that are in the updated record table.

In a possible design, the obtaining module 41 is specifically configured to:

determine, based on the first KPI parameter value set and the second KPI parameter value set, a KPI evaluation value of the cell and a KPI evaluation value of a cluster in which the cell is located:

determine an energy saving evaluation value of the cell based on the first energy saving parameter value set and the second energy saving parameter value set; and obtain, based on the KPI evaluation value of the cell, the KPI evaluation value of the cluster in which the cell is located, and the energy saving evaluation value of the cell, an evaluation value corresponding to the preselected load threshold in the first periodicity.

In a possible design, the determining module 42 is specifically configured to:

determine a first probability that a first preselected load threshold is determined as the target load threshold of the cell in the second periodicity, where the first preselected load threshold is a preselected load threshold corresponding to a largest evaluation value among all the evaluation values;

determine a second probability that a second preselected load threshold is determined as the target load threshold of the cell in the second periodicity, where the second preselected load threshold is any load threshold other than the first preselected load threshold in the plurality of preselected load thresholds; and determine the target load threshold of the cell based on the first probability and the second probability.

In a possible design, the determining module 42 is specifically configured to:

determine a third probability based on a periodicity sequence number of the second periodicity and a quantity of preselected load thresholds; and determine a difference between 1 and the third probability as the first probability.

In a possible design, the determining module is specifically configured to: determine the second probability based on the third probability and the quantity of preselected load thresholds.

In a possible design, the obtaining module 41 is specifically configured to:

for a first-type KPI, determine, based on parameters corresponding to the first-type KPI in the first KPI parameter value set and the second KPI parameter value set, a first target KPI evaluation value that is of the cluster and that corresponds to the first-type KPI:

for a second-type KPI, determine, based on parameters corresponding to the second-type KPI in the first KPI parameter value set and the second KPI parameter value set, a second target KPI evaluation value that is of the cluster and that corresponds to the second-type KPI; and obtain, based on each first target KPI evaluation value and/or each second target KPI evaluation value, the KPI evaluation value of the cluster in which the cell is located.

In a possible design, the obtaining module is specifically configured to:

obtain a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a first difference between the first ratio and the second ratio is less than or equal to 0, determine that the first target KPI evaluation value is a first preset value; or if the first difference is greater than 0, determine that the first target KPI evaluation value is a third target KPI evaluation value, where the third target KPI evaluation value is a KPI evaluation value that is of the cluster, that corresponds to the first-type KPI, and that corresponds to the preselected load threshold in the third periodicity; or obtain a first value based on parameters that correspond to the first-type KPI and that are in first KPI parameter value sets corresponding to all cells included in the cluster in which the cell is located;

obtain a second value based on parameters that correspond to the first-type KPI and that are in second KPI parameter value sets corresponding to all the cells included in the cluster in which the cell is located, and if a value obtained by dividing a difference between the first value and the second value by the first value is less than or equal to a third value, determine that the first target KPI evaluation value is the third target KPI evaluation value, where the third value is a preset multiple of a ratio of a first standard deviation to a first average value, the first standard deviation is a standard deviation of first values corresponding to a preset quantity of periodicities before the first periodicity, and the first average value is an average value of the first values corresponding to the preset quantity of periodicities before the first periodicity; or if a value obtained by dividing a difference between the first value and the second value by the first value is greater than the third value and the cell is in a first cell set, determine that the first target KPI evaluation value is a second preset value; or if a value obtained by dividing a difference between the first value and the second value by the first value is greater than the third value and the cell is not in a first cell set, determine that the first target KPI evaluation value is the third target KPI evaluation value, where the first cell set is a set of W cells with first differences ranking top W after first differences are sorted in descending order in cells included in the cluster with the first difference greater than 0.

In a possible design, the obtaining module 41 is specifically configured to:

obtain a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set;

if a second difference between the third ratio and the fourth ratio is greater than or equal to 0, determine that the second target KPI evaluation value is a first preset value; or if the second difference is less than 0, determine that the second target KPI evaluation value is a fourth target KPI evaluation value, where the fourth target KPI evaluation value is a KPI evaluation value that is of the cluster, that corresponds to the second-type KPI, and that corresponds to the preselected load threshold in the third periodicity; or obtain a fourth value based on parameters that correspond to the second-type KPI and that are in first KPI parameter value sets corresponding to all cells included in the cluster in which the cell is located;

obtain a fifth value based on parameters that correspond to the second-type KPI and that are in second KPI parameter value sets corresponding to all the cells included in the cluster in which the cell is located; and if a value obtained by dividing a second difference between the fourth value and the fifth value by the fourth value is greater than or equal to a sixth value, determine that the second target KPI evaluation value in the first periodicity is the fourth target KPI evaluation value, where the sixth value is an opposite number of a preset multiple of a ratio of a second standard deviation to a second average value, the second standard deviation is a standard deviation of fourth values corresponding to a preset quantity of periodicities before the first periodicity, and the second average value is an average value of the fourth values corresponding to the preset quantity of periodicities before the first periodicity; or if a value obtained by dividing a difference between the fourth value and the fifth value by the fourth value is less than a sixth value and the cell is in a second cell set, determine that the second target KPI evaluation value is a second preset value; or if a value obtained by dividing a difference between the fourth value and the fifth value by the fourth value is less than a sixth value and the cell is not in a second cell set, determine that the second target KPI evaluation value is the fourth target KPI evaluation value, where the second cell set is a set of W cells with second differences ranking top W after absolute values of second differences are sorted in descending order in cells included in the cluster with the second differences less than or equal to 0.

In a possible design, the obtaining module 41 is specifically configured to:

for a first-type KPI:

obtain a first ratio and a second ratio, where the first ratio is a ratio between a numerator filtering value and a denominator filtering value that correspond to the first-type KPI and that are in the first KPI parameter value set, and the second ratio is a ratio between a numerator filtering value and a denominator filtering value that correspond to the first-type KPI and that are in the second KPI parameter value set; and if a difference between the first ratio and the second ratio is greater than a first absolute deterioration threshold of the cell, determine that a fifth target KPI evaluation value that is of the cell and that corresponds to the first-type KPI is a second preset value, or if a difference between the first ratio and the second ratio is less than or equal to the first absolute deterioration threshold, determine that the fifth target KPI evaluation value is a first preset value, where the first absolute deterioration threshold is a third standard deviation multiplied by a first coefficient, and the third standard deviation is a standard deviation of a plurality of first-type KPIs of the cell within first preset duration before the first periodicity:

for a second-type KPI:

obtain a third ratio and a fourth ratio, where the third ratio is a ratio between a numerator filtering value and a denominator filtering value that correspond to the second-type KPI and that are in the first KPI parameter value set, and the fourth ratio is a ratio between a numerator filtering value and a denominator filtering value that correspond to the second-type KPI and that are in the second KPI parameter value set; and if a difference between the third ratio and the fourth ratio is less than a second absolute deterioration threshold of the cell, determine that a sixth target KPI evaluation value that is of the cell and that corresponds to the second-type KPI is a second preset value; or if a difference between the third ratio and the fourth ratio is greater than or equal to the second absolute deterioration threshold, determine that the sixth target KPI evaluation value is a first preset value, where the second absolute deterioration threshold is an opposite number of a product of a fourth standard deviation and a first coefficient, and the fourth standard deviation is a standard deviation of a plurality of second-type KPIs of the cell within first preset duration before the first periodicity; and obtain the KPI evaluation value of the cell based on each fifth target KPI evaluation value and/or each sixth target KPI evaluation value.

In a possible design, the obtaining module 41 is further configured to: before obtaining the target KPI parameter values of the cell when the load threshold of the cell is the first load threshold in the third periodicity:

obtain each original KPI and each original energy saving value when the load threshold of the cell is a first load threshold in the third periodicity;

for a first-type KPI in the original KPIs, determine whether an absolute value of a difference between a first original KPI and a third average value corresponding to the first-type KPI is greater than a seventh value, and if an obtained determining result is yes, determine that the first original KPI is a normal value, where the third average value is a historical average value of the first original KPI, the seventh value is equal to a second coefficient multiplied by a fifth standard deviation, the fifth standard deviation is a standard deviation of a plurality of first-type KPIs of the cell within second preset duration before the third periodicity, and optionally, the second coefficient may be 4; and for a second-type KPI in the original KPIs, determine whether an absolute value of a difference between a second original KPI and a fourth average value corresponding to the second-type KPI is less than an eighth value, and if an obtained determining result is yes, determine that the second original KPI is a normal value, where the fourth average value is a historical average value of the second original KPI, the eighth value is equal to an opposite number of a product of the second coefficient and a sixth standard deviation, and the sixth standard deviation is a standard deviation of a plurality of second-type KPIs of the cell within the second preset duration before the third periodicity.

It should be noted that, the modules in the load threshold determining apparatus in this embodiment of this application are functional subjects for implementing various steps included in the load threshold determining method in this application, that is, functional subjects having functions of completely implementing the steps and extensions and variations of the steps in the load threshold determining method in this application. For details, refer to the description of the load threshold determining method in this specification. For brevity, details are not described in this specification.

Figure 5:
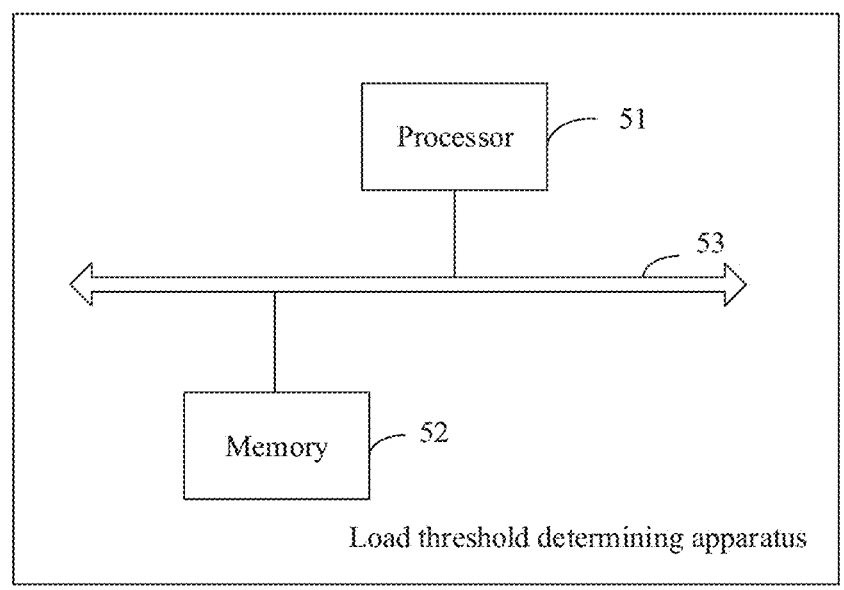
FIG. 5 is a schematic structural diagram of a load threshold determining device according to an embodiment of this application.

FIG. 5 is a schematic structural diagram of a load threshold determining device according to an embodiment of this application. Referring to FIG. 5, the device in this embodiment may include a processor 51, a memory 52, and a communications bus 53. The processor 51 and the memory 52 are connected by using the communications bus 53. The memory 52 is configured to store an instruction, and the processor 51 is configured to execute the instruction stored in the memory. The memory of the encoding device stores program code, and the processor 51 may invoke the program code stored in the memory 52 to perform the load threshold determining method described in this application. To avoid repetition, details are not described herein again.

The memory storing the instruction may also be a memory outside the load threshold determining device.

In the embodiment of this application, the processor 51 may be a central processing unit (CPU for short), or the processor 51 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 52 may include a read-only memory (ROM) device or a random access memory (RAM) device. Any other suitable type of storage device may also be used as the memory 52. The memory 52 may include code and data to be accessed by the processor 51 by using the communications bus 53. The memory 52 may further include an operating system and an application program.

The communications bus 53 may further include a power bus, a control bus, a status signal bus, and the like, in addition to a data bus. However, for clear description, various types of buses in the figure are marked as the communications bus 53.

Optionally, the load threshold determining device may further include one or more output devices, such as a display. In an example, the display may be a tactile display that combines the display with a tactile unit operable to sense a touch input. The display may be connected to the processor 51 by using the communications bus 53.

A person skilled in the art can appreciate that functions described in connection with various illustrative logical blocks, modules, and algorithm steps disclosed and described herein may be implemented by hardware, software, firmware, or any combination thereof. If implemented by software, the functions described by various illustrative logical blocks, modules, and steps may be stored or transmitted as one or more instructions or code on a computer-readable medium and executed by a hardware-based processing unit. The computer-readable medium may include a computer-readable storage medium corresponding to a tangible medium, such as a data storage medium, or any communications medium that facilitates transmission of a computer program from one place to another (for example, based on a communication protocol). In this manner, the computer-readable medium may be generally corresponding to: (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example and not limitation, some computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of an instruction or a data structure and can be accessed by a computer. In addition, any connection is appropriately referred to as a computer-readable medium. For example, if an instruction is sent from a website, a server, or another remote source by using a coaxial cable, an optical cable, a twisted pair, a digital subscriber line (DSL), or a wireless technology such as infrared, radio, and microwave, the coaxial cable, the optical cable, the twisted pair, the DSL, or the wireless technology such as infrared, radio, and microwave is included in a definition of a medium. However, it should be understood that the computer-readable storage medium and the data storage medium may not include a connection, a carrier, a signal, or another transitory medium, but actually mean non-transitory tangible storage media. A disk and an optical disc used in this specification include a compact disc (CD), a laser disc, an optical disc, a digital versatile disc (DVD), and a Blu-ray disc, where the disk generally magnetically reproduces data, and the optical disc optically reproduces data by using a laser. A combination of the foregoing objects shall further be included in the scope of the computer-readable medium.

An instruction may be executed by one or more processors such as one or more digital signal processors (DSP), a general microprocessor, an application-specific integrated circuit (ASIC), a field programmable gate array (FPGA), or an equivalent integrated or discrete logic circuit. Therefore, the term "processor" used in this specification may refer to the foregoing structure, or any other structure that may be applied to implementation of the technologies described in this specification. Moreover, in some aspects, the functions described in the various illustrative logical blocks, modules, and steps described herein may be provided within dedicated hardware and/or software modules configured to perform encoding and decoding, or incorporated into a combined codec. In addition, the technologies may be completely implemented in one or more circuits or logic elements.

The technologies of this application may be implemented in various apparatuses or devices, including wireless handheld phones, integrated circuits (ICs), or a set of ICs (for example, chipsets). Various components, modules, or units are described in this application to emphasize functional aspects of the apparatus for performing the disclosed technologies, but are not necessarily implemented by different hardware units. Actually, as described above, various units may be combined in a codec hardware unit in combination with appropriate software and/or firmware, or provided by an interoperable hardware unit (including one or more processors as described above).

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
   at least one processor; and
   one or more memories coupled to the at least one processor, wherein the one or more memories comprise instructions that, when executed by the at least one processor cause the apparatus to perform operations comprising:
      obtaining a plurality of preselected load thresholds of a cell, wherein the obtaining the plurality of preselected load thresholds comprises:
         obtaining the plurality of preselected load thresholds based on a maximum load threshold of the cell and a minimum load threshold of the cell, wherein the plurality of preselected load thresholds comprise the maximum load threshold of the cell and the minimum load threshold of the cell, and wherein obtaining the plurality of preselected load thresholds based on the maximum load threshold of the cell and the minimum load threshold of the cell comprises:
            obtaining parameter value groups respectively corresponding to a plurality of time periods of the cell, wherein one parameter value group comprises a value of at least one first parameter corresponding to a corresponding time period of the cell, and wherein the at least one first parameter comprises load;
            based on the parameter value groups respectively corresponding to the plurality of time periods: determining a first relationship between at least one first parameter and a throughput rate; and determining M second relationships between the at least one first parameter and M key performance indicators (KPIs), wherein M is a positive integer; and
            determining the maximum load threshold based on the first relationship and the M second relationships;
      obtaining an evaluation value of a plurality of evaluation values corresponding to each preselected load threshold in a first periodicity, wherein each evaluation value is used to evaluate key performance indicator (KPI) information and energy saving information of the cell; and
      determining a target load threshold of the cell in a second periodicity based on the plurality of evaluation values, wherein the target load threshold is a load threshold in the plurality of preselected load thresholds, and wherein the second periodicity is a next periodicity of the first periodicity.

2. The apparatus according to claim 1, wherein the operations further comprise:
   determining a first load corresponding to a maximum value of a throughput rate corresponding to a first curve, wherein the first curve is a curve corresponding to the first relationship;
   determining M second loads corresponding to maximum values of M KPIs corresponding to M second curves, wherein the M second curves are curves corresponding to the M second relationships, and wherein the M second curves and the M second relationships are in a one-to-one correspondence; and
   determining a smallest value in the first load and the M second loads as the maximum load threshold.

3. The apparatus according to claim 1, wherein the operations further comprise:
   obtaining each target KPI parameter value and each target energy saving parameter value of the cell when a load threshold of the cell is a first load threshold in a third periodicity, wherein the first load threshold is a target load threshold of the cell in the third periodicity, and wherein the third periodicity is a previous periodicity of the first periodicity; and
   updating each KPI parameter value that corresponds to the first load threshold and that is recorded in a current record table to each target KPI parameter value, and updating each energy saving parameter value that corresponds to the first load threshold and that is recorded in the current record table to each target energy saving parameter value, to obtain an updated record table, wherein the updated record table records each KPI parameter value, each energy saving parameter value, and an evaluation value that correspond to each preselected load threshold.

4. The apparatus according to claim 3, wherein the obtaining an evaluation value corresponding to each preselected load threshold in a first periodicity comprises:
for a preselected load threshold, determining, based on a first KPI parameter value set, a second KPI parameter value set, a first energy saving parameter value set, and a second energy saving parameter value set, an evaluation value corresponding to the preselected load threshold in the first periodicity, wherein the first KPI parameter value set is a set of KPI parameter values that correspond to the preselected load threshold and that are recorded in the updated record table, wherein the second KPI parameter value set is a set of KPI parameter values that correspond to a minimum load threshold and that are in the updated record table, wherein the first energy saving parameter value set is a set of energy saving parameter values that correspond to the preselected load threshold and that are in the updated record table, and wherein the second energy saving parameter value set is a set of energy saving parameter values that correspond to the minimum load threshold and that are in the updated record table.

5. The apparatus according to claim 4, wherein the operations further comprise:
determining, based on the first KPI parameter value set and the second KPI parameter value set, a KPI evaluation value of the cell and a KPI evaluation value of a cluster in which the cell is located;
determining an energy saving evaluation value of the cell based on the first energy saving parameter value set and the second energy saving parameter value set; and
obtaining, based on the KPI evaluation value of the cell, the KPI evaluation value of the cluster in which the cell is located, and the energy saving evaluation value of the cell, the evaluation value corresponding to the preselected load threshold in the first periodicity.

6. The apparatus according to claim 3, wherein the operations further comprise:
determining a first probability that a first preselected load threshold is determined as the target load threshold of the cell in the second periodicity, wherein the first preselected load threshold is a preselected load threshold corresponding to a largest evaluation value among the plurality of evaluation values;
determining a second probability that a second preselected load threshold is determined as the target load threshold of the cell in the second periodicity, wherein the second preselected load threshold is any load threshold other than the first preselected load threshold in the plurality of preselected load thresholds; and
determining the target load threshold of the cell based on the first probability and the second probability.

7. The apparatus according to claim 6, wherein the operations further comprise:
determining a third probability based on a periodicity sequence number of the second periodicity and a quantity of preselected load thresholds; and
determining a difference between 1 and the third probability as the first probability.

8. The apparatus according to claim 7, wherein the operations further comprise:
determining the second probability based on the third probability and the quantity of preselected load thresholds.

9. The apparatus according to claim 5, wherein the operations further comprise:
for a first-type KPI, determining, based on parameters corresponding to the first-type KPI in the first KPI parameter value set and the second KPI parameter value set, a first target KPI evaluation value that is of the cluster and that corresponds to the first-type KPI;
for a second-type KPI, determining, based on parameters corresponding to the second-type KPI in the first KPI parameter value set and the second KPI parameter value set, a second target KPI evaluation value that is of the cluster and that corresponds to the second-type KPI; and
obtaining, based on at least one of each first target KPI evaluation value or each second target KPI evaluation value, the KPI evaluation value of the cluster in which the cell is located.

10. The apparatus according to claim 9, wherein the operations further comprise:
obtaining a first ratio and a second ratio, wherein the first ratio is a ratio between a numerator filtering value and a denominator filtering value that correspond to the first-type KPI and that are in the first KPI parameter value set, and wherein the second ratio is a ratio between a numerator filtering value and a denominator filtering value that correspond to the first-type KPI and that are in the second KPI parameter value set; and
if a first difference between the first ratio and the second ratio is less than or equal to 0, determining that the first target KPI evaluation value is a first preset value; or
if the first difference is greater than 0, determining that the first target KPI evaluation value is a third target KPI evaluation value, wherein the third target KPI evaluation value is a KPI evaluation value that is of the cluster, that corresponds to the first-type KPI, and that corresponds to the preselected load threshold in the third periodicity; or
obtaining a first value based on parameters that correspond to the first-type KPI and that are in first KPI parameter value sets corresponding to all cells comprised in the cluster in which the cell is located;
obtaining a second value based on parameters that correspond to the first-type KPI and that are in second KPI parameter value sets corresponding to all the cells comprised in the cluster in which the cell is located; and
if a value obtained by dividing a difference between the first value and the second value by the first value is less than or equal to a third value, determining that the first target KPI evaluation value is the third target KPI evaluation value, wherein the third value is a preset multiple of a ratio of a first standard deviation to a first average value, where the first standard deviation is a standard deviation of first values corresponding to a preset quantity of periodicities before the first periodicity, and wherein the first average value is an average value of the first values corresponding to the preset quantity of periodicities before the first periodicity; or
if a value obtained by dividing a difference between the first value and the second value by the first value is greater than the third value and the cell is in a first cell set, determining that the first target KPI evaluation value is a second preset value; or
if a value obtained by dividing a difference between the first value and the second value by the first value is greater than the third value and the cell is not in a first cell set, determining that the first target KPI evaluation value is the third target KPI evaluation value, wherein the first cell set is a set of W cells with first differences ranking top W after first differences are sorted in descending order in cells comprised in the cluster with the first differences greater than 0.

11. The apparatus according to claim 9, wherein the operations further comprise:
obtaining a third ratio and a fourth ratio, wherein the third ratio is a ratio between a numerator filtering value and a denominator filtering value that correspond to the second-type KPI and that are in the first KPI parameter value set, and wherein the fourth ratio is a ratio between a numerator filtering value and a denominator filtering value that correspond to the second-type KPI and that are in the second KPI parameter value set; and
if a second difference between the third ratio and the fourth ratio is greater than or equal to 0, determining that the second target KPI evaluation value is a first preset value; or
if the second difference is less than 0, determining that the second target KPI evaluation value is a fourth target KPI evaluation value, wherein the fourth target KPI evaluation value is a KPI evaluation value that is of the cluster, that corresponds to the second-type KPI, and that corresponds to the preselected load threshold in the third periodicity; or
obtaining a fourth value based on parameters that correspond to the second-type KPI and that are in first KPI parameter value sets corresponding to all cells comprised in the cluster in which the cell is located;
obtaining a fifth value based on parameters that correspond to the second-type KPI and that are in second KPI parameter value sets corresponding to all the cells comprised in the cluster in which the cell is located; and
if a value obtained by dividing a second difference between the fourth value and the fifth value by the fourth value is greater than or equal to a sixth value, determining that the second target KPI evaluation value in the first periodicity is the fourth target KPI evaluation value, wherein the sixth value is an opposite number of a preset multiple of a ratio of a second standard deviation to a second average value, wherein the second standard deviation is a standard deviation of fourth values corresponding to a preset quantity of periodicities before the first periodicity, and wherein the second average value is an average value of the fourth values corresponding to the preset quantity of periodicities before the first periodicity; or
if a value obtained by dividing a difference between the fourth value and the fifth value by the fourth value is less than a sixth value and the cell is in a second cell set, determining that the second target KPI evaluation value is a second preset value; or
if a value obtained by dividing a difference between the fourth value and the fifth value by the fourth value is less than a sixth value and the cell is not in a second cell set, determining that the second target KPI evaluation value is the fourth target KPI evaluation value, wherein the second cell set is a set of W cells with second differences ranking top W after absolute values of second differences are sorted in descending order in cells comprised in the cluster with the second differences less than or equal to 0.

12. The apparatus according to claim 5, wherein the operations further comprise:
for a first-type KPI:
obtaining a first ratio and a second ratio, wherein the first ratio is a ratio between a numerator filtering value and a denominator filtering value that correspond to the first-type KPI and that are in the first KPI parameter value set, and wherein the second ratio is a ratio between a numerator filtering value and a denominator filtering value that correspond to the first-type KPI and that are in the second KPI parameter value set; and
if a difference between the first ratio and the second ratio is greater than a first absolute deterioration threshold of the cell, determining that a fifth target KPI evaluation value that is of the cell and that corresponds to the first-type KPI is a second preset value; or
if a difference between the first ratio and the second ratio is less than or equal to the first absolute deterioration threshold, determining that the fifth target KPI evaluation value is a first preset value, wherein the first absolute deterioration threshold is a third standard deviation multiplied by a first coefficient, and wherein the third standard deviation is a standard deviation of a plurality of first-type KPIs of the cell within first preset duration before the first periodicity;
for a second-type KPI:
obtaining a third ratio and a fourth ratio, wherein the third ratio is a ratio between a numerator filtering value and a denominator filtering value that correspond to the second-type KPI and that are in the first KPI parameter value set, and wherein the fourth ratio is a ratio between a numerator filtering value and a denominator filtering value that correspond to the second-type KPI and that are in the second KPI parameter value set; and
if a difference between the third ratio and the fourth ratio is less than a second absolute deterioration threshold of the cell, determining that a sixth target KPI evaluation value that is of the cell and that corresponds to the second-type KPI is a second preset value; or
if a difference between the third ratio and the fourth ratio is greater than or equal to the second absolute deterioration threshold, determining that the sixth target KPI evaluation value is a first preset value, wherein the second absolute deterioration threshold is an opposite number of a product of a fourth standard deviation and a first coefficient, and wherein the fourth standard deviation is a standard deviation of a plurality of second-type KPIs of the cell within first preset duration before the first periodicity; and
obtaining the KPI evaluation value of the cell based on at least one of each fifth target KPI evaluation value or each sixth target KPI evaluation value.

13. A method, comprising:
obtaining a plurality of preselected load thresholds of a cell, wherein the obtaining the plurality of preselected load thresholds comprises:
obtaining the plurality of preselected load thresholds based on a maximum load threshold of the cell and a minimum load threshold of the cell, wherein the plurality of preselected load thresholds comprise the maximum load threshold of the cell and the minimum load threshold of the cell, and wherein obtaining the plurality of preselected load thresholds based on the maximum load threshold of the cell and the minimum load threshold of the cell comprises:

obtaining parameter value groups respectively corresponding to a plurality of time periods of the cell, wherein one parameter value group comprises a value of at least one first parameter corresponding to a corresponding time period of the cell, and wherein the at least one first parameter comprises load;

based on the parameter value groups respectively corresponding to the plurality of time periods:

determining a first relationship between at least one first parameter and a throughput rate; and determining M second relationships between the at least one first parameter and M key performance indicators (KPIs), wherein M is a positive integer; and determining the maximum load threshold based on the first relationship and the M second relationships;

obtaining an evaluation value of a plurality of evaluation values corresponding to each preselected load threshold in a first periodicity, wherein each evaluation value is used to evaluate key performance indicator (KPI) information and energy saving information of the cell; and determining a target load threshold of the cell in a second periodicity based on the plurality of evaluation values, wherein the target load threshold is a load threshold in the plurality of preselected load thresholds, and wherein the second periodicity is a next periodicity of the first periodicity.

14. The method according to claim 13, wherein the determining the maximum load threshold based on the first relationship and the M second relationships comprises:

determining a first load corresponding to a maximum value of a throughput rate corresponding to a first curve, wherein the first curve is a curve corresponding to the first relationship;

determining M second loads corresponding to maximum values of M KPIs corresponding to M second curves, wherein the M second curves are curves corresponding to the M second relationships, and wherein the M second curves and the M second relationships are in a one-to-one correspondence; and determining a smallest value in the first load and the M second loads as the maximum load threshold.

15. The method according to claim 13, wherein, before the obtaining an evaluation value corresponding to each preselected load threshold in a first periodicity, the method further comprises:

obtaining each target KPI parameter value and each target energy saving parameter value of the cell when a load threshold of the cell is a first load threshold in a third periodicity, wherein the first load threshold is a target load threshold of the cell in the third periodicity, and where the third periodicity is a previous periodicity of the first periodicity; and updating each KPI parameter value that corresponds to the first load threshold and that is recorded in a current record table to each target KPI parameter value, and updating each energy saving parameter value that corresponds to the first load threshold and that is recorded in the current record table to each target energy saving parameter value, to obtain an updated record table, wherein the updated record table records each KPI parameter value, each energy saving parameter value, and an evaluation value that correspond to each preselected load threshold.

16. The method according to claim 15, wherein the obtaining an evaluation value corresponding to each preselected load threshold in a first periodicity comprises:

for a preselected load threshold, determining, based on a first KPI parameter value set, a second KPI parameter value set, a first energy saving parameter value set, and a second energy saving parameter value set, an evaluation value corresponding to the preselected load threshold in the first periodicity, wherein the first KPI parameter value set is a set of KPI parameter values that correspond to the preselected load threshold and that are recorded in the updated record table, wherein the second KPI parameter value set is a set of KPI parameter values that correspond to a minimum load threshold and that are in the updated record table, wherein the first energy saving parameter value set is a set of energy saving parameter values that correspond to the preselected load threshold and that are in the updated record table, and wherein the second energy saving parameter value set is a set of energy saving parameter values that correspond to the minimum load threshold and that are in the updated record table.

17. A non-transitory computer-readable storage medium, wherein the computer-readable storage medium stores a computer program, and when the computer program is executed by one or more processors, cause an apparatus to perform operations comprising:

obtaining a plurality of preselected load thresholds of a cell, wherein the obtaining the plurality of preselected load thresholds comprises:

obtaining the plurality of preselected load thresholds based on a maximum load threshold of the cell and a minimum load threshold of the cell, wherein the plurality of preselected load thresholds comprise the maximum load threshold of the cell and the minimum load threshold of the cell, and wherein obtaining the plurality of preselected load thresholds based on the maximum load threshold of the cell and the minimum load threshold of the cell comprises:

obtaining parameter value groups respectively corresponding to a plurality of time periods of the cell, wherein one parameter value group comprises a value of at least one first parameter corresponding to a corresponding time period of the cell, and wherein the at least one first parameter comprises load;

based on the parameter value groups respectively corresponding to the plurality of time periods:

determining a first relationship between at least one first parameter and a throughput rate; and determining M second relationships between the at least one first parameter and M key performance indicators (KPIs), wherein M is a positive integer; and determining the maximum load threshold based on the first relationship and the M second relationships;

obtaining an evaluation value of a plurality of evaluation values corresponding to each preselected load threshold in a first periodicity, wherein each evaluation value is used to evaluate key performance indicator (KPI) information and energy saving information of the cell; and determining a target load threshold of the cell in a second periodicity based on the plurality of evaluation values, wherein the target load threshold is a load threshold in the plurality of preselected load thresholds, and wherein the second periodicity is a next periodicity of the first periodicity.

18. The non-transitory computer-readable storage medium according to claim 17, wherein the operations further comprise:
   determining a first load corresponding to a maximum value of a throughput rate corresponding to a first curve, wherein the first curve is a curve corresponding to the first relationship;
   determining M second loads corresponding to maximum values of M KPIs corresponding to M second curves, wherein the M second curves are curves corresponding to the M second relationships, and wherein the M second curves and the M second relationships are in a one-to-one correspondence; and
   determining a smallest value in the first load and the M second loads as the maximum load threshold.

19. The non-transitory computer-readable storage medium according to claim 17, wherein the operations further comprise:
   obtaining each target KPI parameter value and each target energy saving parameter value of the cell when a load threshold of the cell is a first load threshold in a third periodicity, wherein the first load threshold is a target load threshold of the cell in the third periodicity, and wherein the third periodicity is a previous periodicity of the first periodicity; and
   updating each KPI parameter value that corresponds to the first load threshold and that is recorded in a current record table to each target KPI parameter value, and updating each energy saving parameter value that corresponds to the first load threshold and that is recorded in the current record table to each target energy saving parameter value, to obtain an updated record table, wherein the updated record table records each KPI parameter value, each energy saving parameter value, and an evaluation value that correspond to each preselected load threshold.

20. The non-transitory computer-readable storage medium according to claim 19, wherein the obtaining an evaluation value corresponding to each preselected load threshold in a first periodicity comprises:
   for a preselected load threshold, determining, based on a first KPI parameter value set, a second KPI parameter value set, a first energy saving parameter value set, and a second energy saving parameter value set, an evaluation value corresponding to the preselected load threshold in the first periodicity, wherein the first KPI parameter value set is a set of KPI parameter values that correspond to the preselected load threshold and that are recorded in the updated record table, wherein the second KPI parameter value set is a set of KPI parameter values that correspond to a minimum load threshold and that are in the updated record table, wherein the first energy saving parameter value set is a set of energy saving parameter values that correspond to the preselected load threshold and that are in the updated record table, and wherein the second energy saving parameter value set is a set of energy saving parameter values that correspond to the minimum load threshold and that are in the updated record table.

* * * * *